United States Patent
Nishizawa et al.

(10) Patent No.: US 10,641,155 B2
(45) Date of Patent: May 5, 2020

(54) REGENERATION CONTROL DEVICE FOR EXHAUST GAS TREATMENT DEVICE

(71) Applicant: MITSUBISHI HEAVY INDUSTRIES ENGINE & TURBOCHARGER, LTD., Sagamihara-shi, Kanagawa (JP)

(72) Inventors: Kazuki Nishizawa, Tokyo (JP); Tomohide Yamada, Tokyo (JP); Daisuke Sato, Tokyo (JP); Hiroyuki Ito, Tokyo (JP)

(73) Assignee: MITSUBISHI HEAVY INDUSTRIES ENGINE & TURBOCHARGER, LTD., Kanagawa (JP)

( * ) Notice: Subject to any disclaimer, the term of this patent is extended or adjusted under 35 U.S.C. 154(b) by 0 days.

(21) Appl. No.: 16/072,298

(22) PCT Filed: Jan. 26, 2017

(86) PCT No.: PCT/JP2017/002732
§ 371 (c)(1),
(2) Date: Jul. 24, 2018

(87) PCT Pub. No.: WO2017/131086
PCT Pub. Date: Aug. 3, 2017

(65) Prior Publication Data
US 2019/0024566 A1 Jan. 24, 2019

(30) Foreign Application Priority Data
Jan. 29, 2016 (JP) .................................. 2016-016635

(51) Int. Cl.
*F01N 9/00* (2006.01)
*F01N 11/00* (2006.01)
(Continued)

(52) U.S. Cl.
CPC ............ *F01N 11/002* (2013.01); *F01N 3/023* (2013.01); *F01N 3/106* (2013.01); *F01N 9/002* (2013.01);
(Continued)

(58) Field of Classification Search
CPC ... F01N 9/002; F01N 2260/04; F01N 2550/02
See application file for complete search history.

(56) References Cited

U.S. PATENT DOCUMENTS

2008/0010975 A1* 1/2008 Zhang ..................... F01N 3/035
60/277
2016/0222900 A1 8/2016 Nishizawa et al.

FOREIGN PATENT DOCUMENTS

JP 2011-69323 A 4/2011
JP 2012-127297 A 7/2012
(Continued)

OTHER PUBLICATIONS

Extended European Search Report dated Oct. 15, 2018, issued to the corresponding EP Application No. 17744316.5.

*Primary Examiner* — Jonathan R Matthias
(74) *Attorney, Agent, or Firm* — Birch, Stewart, Kolasch & Birch, LLP

(57) ABSTRACT

A regeneration control device for an exhaust gas treatment device includes: a DOC blockage risk state determination part configured to determine whether the DOC is in a blockage risk state which is a state where blockage of the DOC is likely to occur, on the basis of comparison between a counter value and a threshold related to an operation time of the diesel engine; a DOC temperature increase execution part configured to execute a blockage recovery process for increasing a temperature of the DOC to a first temperature, if it is determined that the DOC is in the blockage risk state; a DPF forced regeneration condition determination part configured to determine whether a forced regeneration
(Continued)

execution condition for the DPF is satisfied; a DPF forced regeneration execution part configured to execute a forced regeneration process for increasing a temperature of the DPF to a second temperature and increasing the temperature of the DOC to the first temperature, if the forced regeneration execution condition is satisfied; and a counter reset process part configured to reset the counter value after completion of the forced regeneration process by the DPF forced regeneration execution part.

19 Claims, 10 Drawing Sheets

(51) Int. Cl.
*F01N 3/023* (2006.01)
*F01N 3/10* (2006.01)
*F01N 13/00* (2010.01)

(52) U.S. Cl.
CPC ........ *F01N 13/009* (2014.06); *F01N 2260/04* (2013.01); *F01N 2430/06* (2013.01); *F01N 2560/06* (2013.01); *F01N 2900/0422* (2013.01); *F01N 2900/1602* (2013.01); *F01N 2900/1606* (2013.01); *Y02T 10/47* (2013.01)

(56) References Cited

FOREIGN PATENT DOCUMENTS

| | | |
|---|---|---|
| JP | 2013-68184 A | 4/2013 |
| JP | 2013-122181 A | 6/2013 |
| JP | 2013-122182 A | 6/2013 |
| JP | 2015-68233 A | 4/2015 |
| JP | 2016-223367 A | 12/2016 |

* cited by examiner

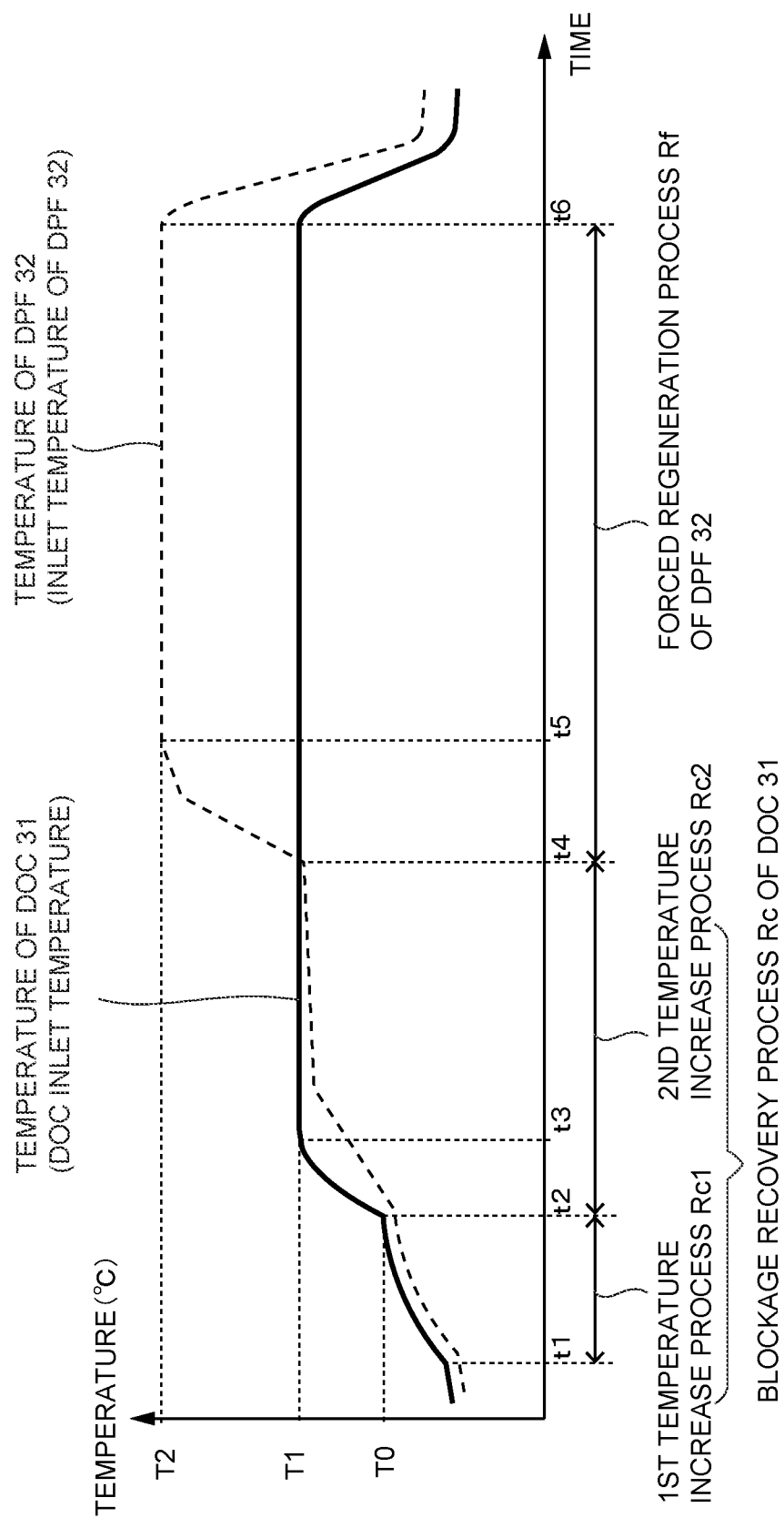

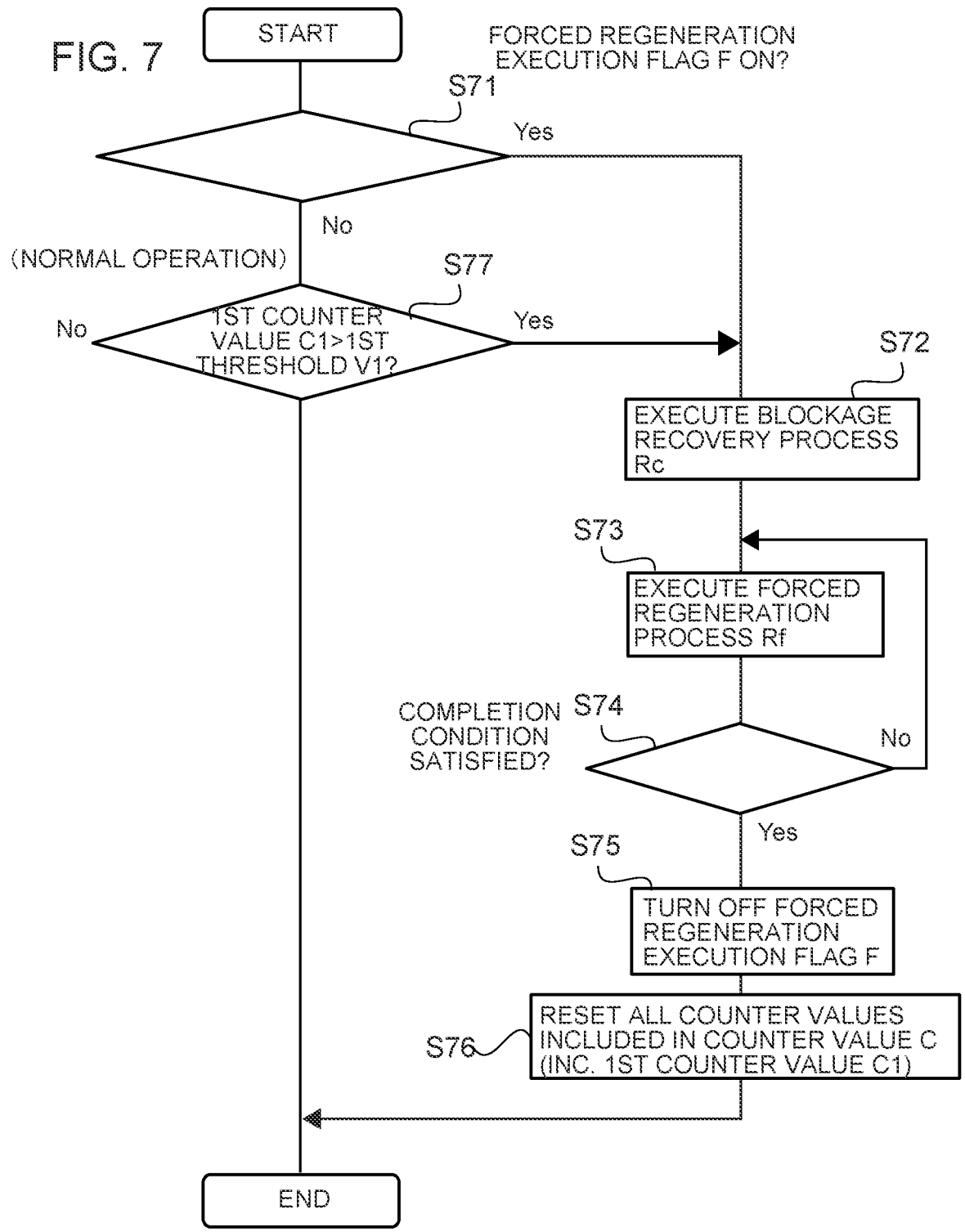

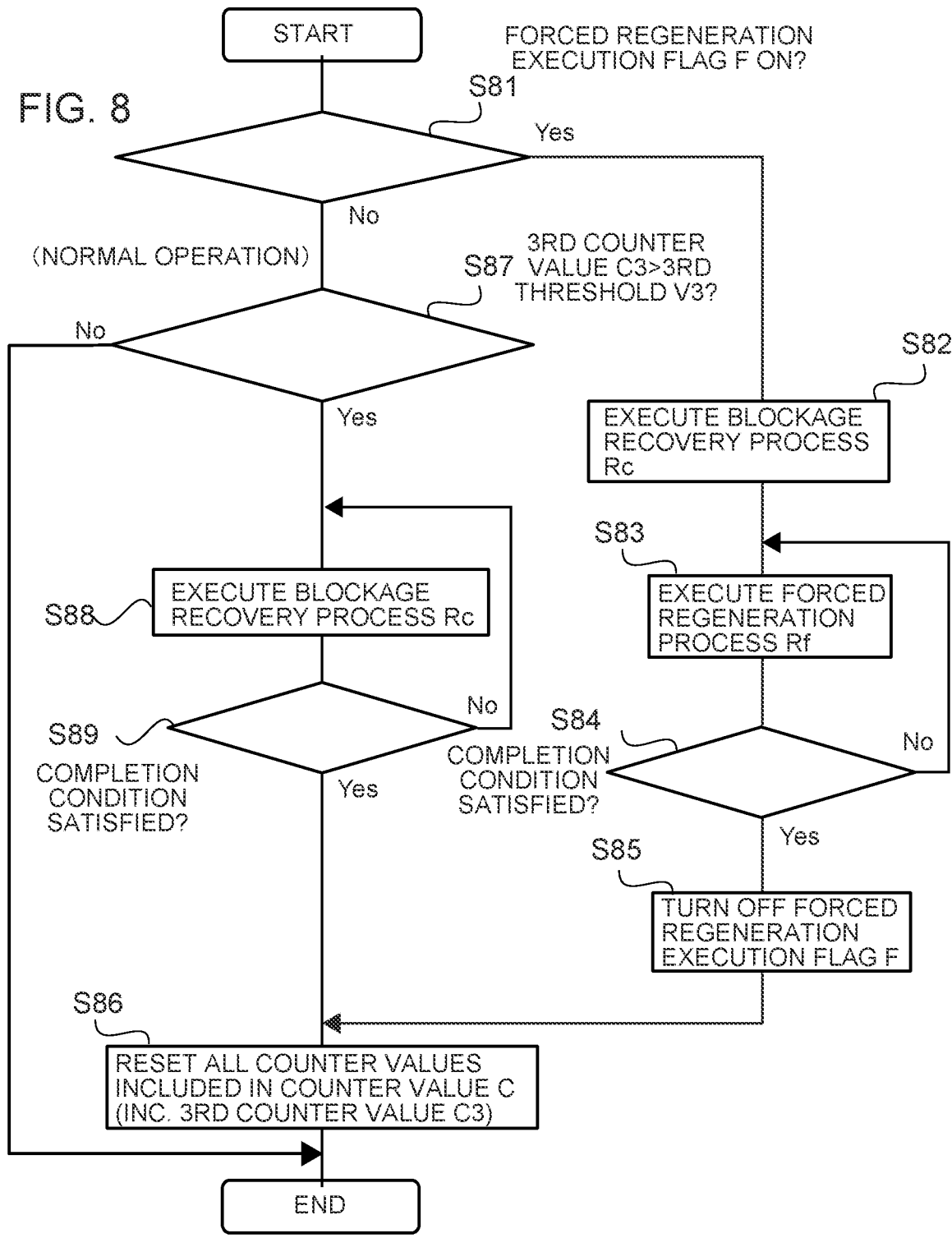

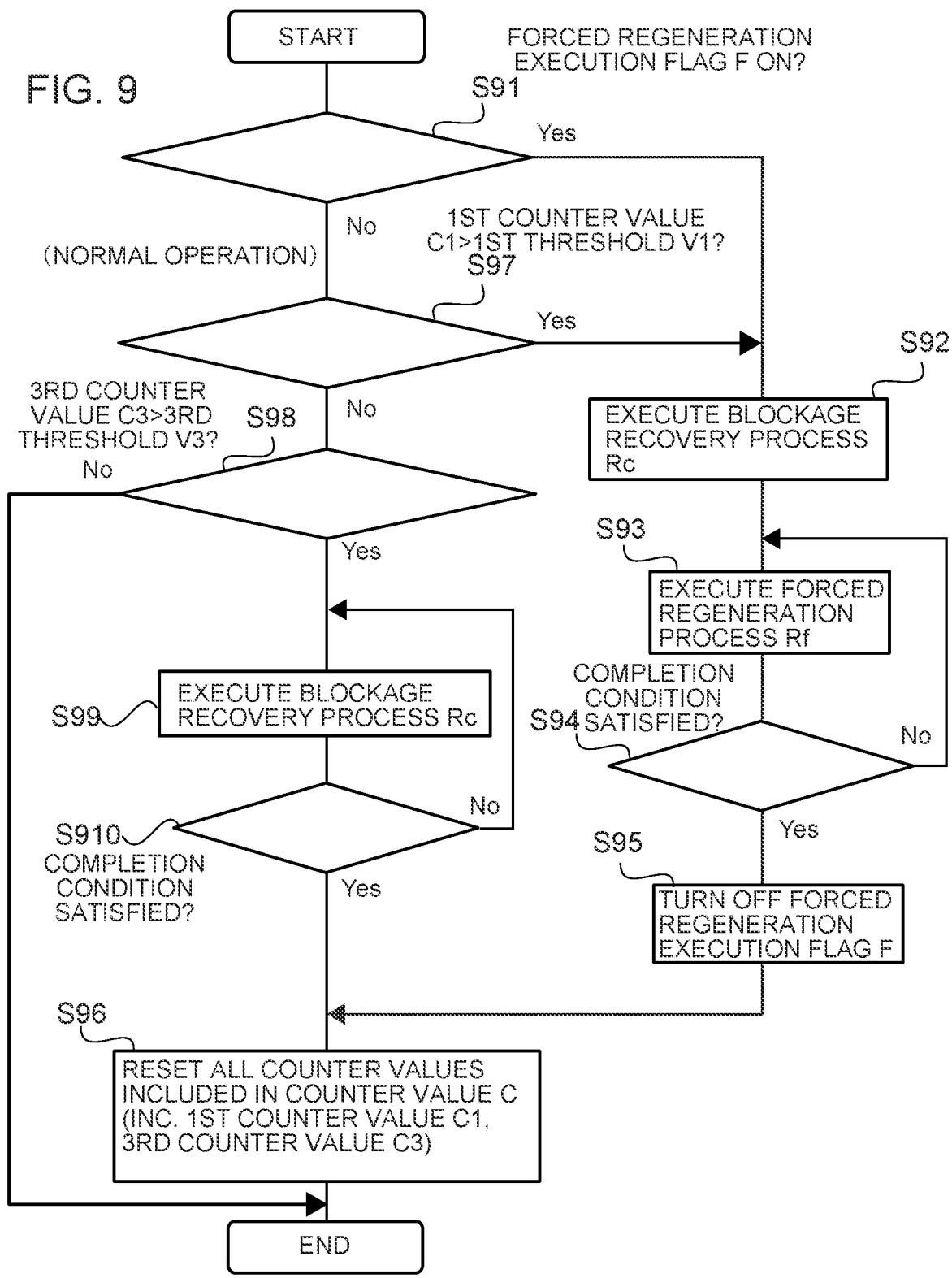

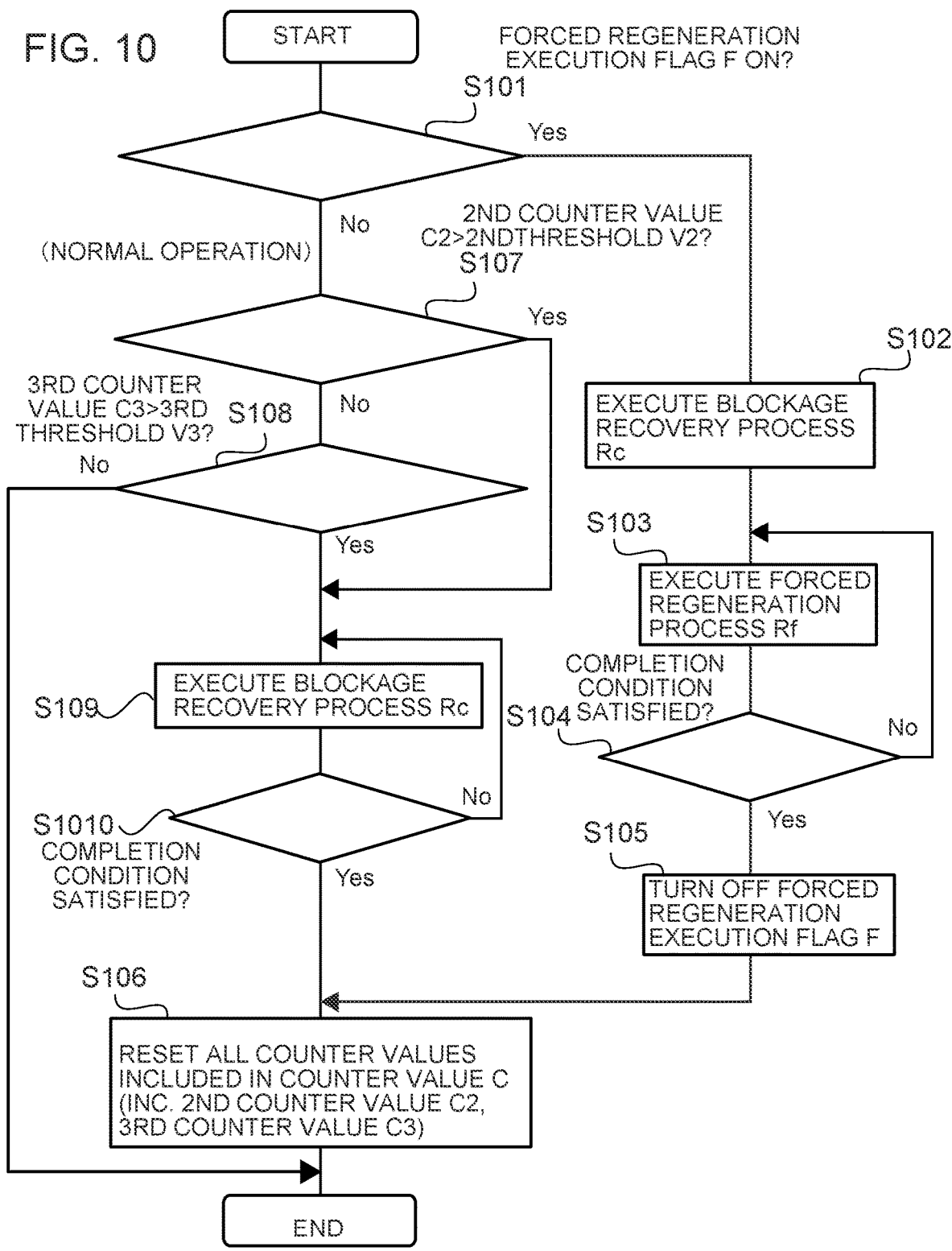

REGENERATION CONTROL DEVICE FOR EXHAUST GAS TREATMENT DEVICE

TECHNICAL FIELD

The present disclosure relates to a regeneration control device for an exhaust gas treatment device, which recovers DOC by removing blockage of DOC disposed in the exhaust passage of a diesel engine, and executes forced regeneration of DPF disposed in the exhaust passage downstream of DOC.

BACKGROUND ART

A diesel engine is equipped with an exhaust gas treatment device including a diesel oxidation catalyst (DOC) disposed in an exhaust passage and a diesel particulate filter (DPF) disposed on the downstream side of the DOC. A diesel particulate filter (DPF) is a device for collecting particulate matters (PM) contained in exhaust gas discharged from the diesel engine. The DPF is normally formed of ceramic or the like in a honeycomb-shaped monolith with adjacent vents closed alternately on the inlet side and the outlet side so that exhaust gas passes through filtering walls which remove PM. The DPF may support a catalyst. Accumulation of PM in the DPF eventually brings about blockage, which leads to not only a decrease in the PM-collecting performance of the DPF but also to an increase in an exhaust pressure and thus has a negative effect on the fuel efficiency. In view of this, it is necessary to perform forced regeneration to remove the PM accumulated in the DPF every time a PM-accumulation amount reaches a predetermined amount or an engine operation time reaches a predetermined time.

Forced regeneration of the DPF is performed by forcedly increasing the inlet temperature of the DPF. In general, the inlet temperature of the DPF is forcedly increased by supplying non-combusted fuel to the exhaust-gas treatment device by post injection, which is to inject fuel after a main-combustion injection timing, and oxidizing the non-combusted fuel with a diesel oxidization catalyst (DOC) so that the temperature of the non-combusted fuel increases. Further, combustion may be supplied by exhaust-pipe injection to an exhaust passage on the downstream side of the engine. The DOC is normally formed of ceramic or the like in a honeycomb-shaped monolith, similarly to the above described DPF, and supports oxidization catalyst on the inner surface of the DOC.

In such an exhaust-gas post treatment device, if a state with a low operation load and a low exhaust-gas temperature continues, SOF or soot of non-combusted fuel or the like adheres to an upstream end surface of the DOC, and blockage of the DOC gradually progresses. If the DOC becomes blocked, the exhaust pressure increases and the fuel efficiency deteriorates, and the non-combusted fuel is not sufficiently oxidized by the DOC and slips, upon forced regeneration of DPF. In response, more and more non-combusted fuel is supplied to the DOC to increase the inlet temperature of the DPF to a predetermined temperature, thereby deteriorating the fuel efficiency. Further, the slipped fuel is oxidized and heated by the DPF supporting a catalyst, and thus promotes abnormal combustion of the PM, thereby raising the risk of heat damage to the DPF. Even further, in a case where the non-combusted fuel upon forced regeneration is performed by the post injection amount, the risk of oil dilution increases.

For instance, Patent Documents 1 and 2 disclose a technique for preventing blockage of DOC. Patent Document 1 discloses a DPF regeneration control device whereby it is possible to prevent blockage of a DOC more efficiently than the conventional technique, and to recover the DOC reliably from the blockage even if the DOC is actually subject to blockage. Specifically, if a blockage parameter related to blockage of DOC detected during automatic regeneration (forced regeneration) of DPF by the first temperature increase unit and the second temperature increase unit exceeds a predetermined blockage threshold for a predetermined period, it is determined that DOC is blocked, and manual regeneration is performed, whose DPF regeneration temperature is higher than that in automatic regeneration. Further, if it is determined from the blockage parameter that DOC is not blocked but in an initial stage of blockage, only the first temperature increase unit continues operation for a predetermined period of time after completion of automatic regeneration, and thereby the temperature of heated DOC is maintained. On the other hand, during normal operation in which forced regeneration (automatic regeneration, manual regeneration) of DPF is not performed, if it is estimated that DOC has been likely to cause blockage, it is determined that DPC is in a blockage risk state, and recovery operation is performed, in which only the first temperature increase unit is operated for a predetermined period of time.

Further, Patent Document 2 discloses combusting and removing non-combusted fuel adhering to the surface of the DOC by maintaining an exhaust-gas temperature at a predetermined temperature with an exhaust-gas temperature maintaining unit after completion of the regeneration process of the DPF in a diesel engine.

CITATION LIST

Patent Literature

Patent Document 1: JP2015-68233A
Patent Document 2: JP2013-68184A

SUMMARY

Problems to be Solved

In Patent Documents 1 and 2, if DOC is determined to be blocked, the DOC is recovered (from the blockage state) simultaneously with forced regeneration of DPF. However, blockage of DOC may occur independently from the timing of forced regeneration of DPF. If DOC is in a blockage state, the fuel efficiency may deteriorate due to an increase in the back pressure. Further, if DOC is in a blockage state at the time of start of forced regeneration of DPF, there is a risk of slip of non-combusted fuel that is supplied upon forced regeneration of DPF, which is accompanied by a decrease in the fuel efficiency, burn damage of DPF, and oil dilution.

In view of the above, an object of at least one embodiment of the present invention is to provide a regeneration control device whereby it is possible to prevent blockage of DOC in advance, and perform recovery of DOC and regeneration of DPF efficiently.

Solution to the Problems (1) A regeneration control device for an exhaust gas treatment device, which performs recovery of a DOC disposed in an exhaust passage of a diesel engine and forced regeneration of a DPF disposed in the exhaust passage downstream of the DOC, according to at least one embodiment of the present invention, includes: a DOC blockage risk state determination part configured to determine whether the DOC is in a blockage risk state which is a state where blockage of the DOC is likely to occur, on the basis of comparison between a counter value and a threshold related to an operation time of the diesel engine; a DOC temperature increase execution part configured to execute a blockage recovery process for increasing a temperature of the DOC to a first temperature, if it is determined that the DOC is in the blockage risk state; a DPF forced regeneration condition determination part configured to determine whether a forced regeneration execution condition for the DPF is satisfied; a DPF forced regeneration execution part configured to execute a forced regeneration process for increasing a temperature of the DPF to a second temperature and increasing the temperature of the DOC to the first temperature, if the forced regeneration execution condition is satisfied; and a counter reset process part configured to reset the counter value after completion of the forced regeneration process by the DPF forced regeneration execution part.

With the above configuration (1), whether the DOC is in the blockage risk state and whether the forced regeneration execution condition of the DPF is satisfied are determined separately. Further, the regeneration control device for the exhaust gas treatment device executes the blockage recovery process if it is determined that the DOC is in the blockage risk state, and executes the forced regeneration process if it is determined that the forced regeneration execution condition is satisfied. After completion of the forced regeneration process of the DPF, the counter value for determining whether the DOC is in the blockage risk state is reset. Accordingly, by starting determination of whether the DOC is in the blockage risk state using the reset counter value after completion of forced regeneration of the DPF, it is possible to perform the blockage recovery process at an appropriate frequency while maintaining the determination accuracy of the blockage risk state.

(2) In some embodiments, in the above configuration (1), the DPF forced regeneration execution part is configured to execute the blockage recovery process and execute the forced regeneration process after completion of the blockage recovery process, if the forced regeneration execution condition is satisfied.

With the above configuration (2), the blockage recovery process and the forced regeneration process are executed if it is determined that the forced regeneration execution condition is satisfied. As described above, if it is determined that the forced regeneration execution condition is satisfied, the forced regeneration process of the DPF and the blockage recovery process of the DOC are executed together, and thus it is possible to efficiently execute recovery of the DOC and regeneration of the DPF. Furthermore, in addition to preventing blockage of the DOC in advance, it is possible to prevent slip of non-combusted fuel due to blockage of the DOC and prevent deterioration of fuel efficiency, burn damage to the DPF, and oil dilution, for the DOC is recovered first before executing forced regeneration of the DPF.

(3) In some embodiments, in the above configuration (1) or (2), the counter value includes a first counter value which is an accumulated duration time, within a closest predetermined period, of a low exhaust temperature operation state in which a temperature of exhaust gas discharged from the diesel engine is lower than an exhaust temperature threshold. The threshold includes a first threshold corresponding to the first counter value. The DOC blockage risk state determination part includes a first blockage risk state determination part configured to determine that the DOC is in the blockage risk state if the first counter value is greater than the first threshold. The DPF forced regeneration execution part is configured to execute the forced regeneration process after completion of the blockage recovery process by the DOC temperature increase execution part, if the first blockage risk state determination part determines that the DOC is in the blockage risk state. The counter reset process part is configured to reset the counter value including the first counter value after completion of the forced regeneration process.

With the above configuration (3), if the blockage risk state of the DOC is determined on the basis of the first counter value and the blockage recovery process is executed in response to determination based on the first counter value, the forced regeneration process of the DPF is also executed. Thus, it is possible to recover the DOC and regenerate the DPF efficiently. Further, if the exhaust gas temperature is continuously below the exhaust temperature threshold, that is, if the low exhaust temperature operation state continues, blockage of the DOC gradually progresses. On the other hand, once the exhaust gas temperature exceeds the exhaust temperature threshold, that is, enters a high exhaust temperature operation state, blockage of the DOC starts to be removed. Thus, by determining the blockage risk state of the DOC with the accumulated duration time of the low exhaust temperature operation state in a closest predetermined time by using the first counter, it is possible to determine the blockage risk state of the DOC accurately. Further, it is possible to prevent blockage (blockage state) of the DOC in advance. Further, it is possible to execute the forced regeneration process from the time when the temperature is increased to the first temperature through the blockage recovery process, and thus it is possible to improve the fuel efficiency.

(4) In some embodiments, in the above configuration (3), the DOC blockage risk state determination part further includes a determination threshold correction part configured to correct at least one of the exhaust temperature threshold or the first threshold on the basis of at least one of an atmospheric pressure, an atmospheric temperature, or a water temperature of the diesel engine.

With the above configuration (4), while the blockage speed of the DOC depends on the external environment in which the diesel engine is situated, it is possible to prevent blockage of the DOC in advance through the blockage recovery process, by correcting the exhaust temperature threshold or the first threshold appropriately in accordance with the external environment estimated from the atmospheric pressure, the atmospheric temperature, or the water temperature of the diesel engine.

(5) In some embodiments, in any one of the above configurations (3) to (4), the regeneration control device further includes a temperature-increase temperature monitoring part configured to monitor the temperature of the DOC during execution of the blockage recovery process.

With the above configuration (5), it is possible to control the blockage recovery process on the basis of the actual temperature of the DOC during execution of the blockage recovery process.

(6) In some embodiments, in the above configuration (5), the counter value includes a second counter value which is an accumulated operation time of the diesel engine. The threshold includes a second threshold corresponding to the second counter value. The DOC blockage risk state determination part further includes a second blockage risk state determination part configured to determine that the DOC is in the blockage risk state if the second counter value is greater than the second threshold. The counter reset process part is configured to reset the counter value including the second counter value after completion of the blockage recovery process executed in response to determination of the second blockage risk state determination part. The regeneration control device for the exhaust gas treatment device further includes a mode start part configured to start a temperature increase failure recovery mode configured to determine, as a temperature increase failure, a case in which the temperature of the DOC is higher than a first temperature threshold which is lower than the first temperature for no longer than a predetermined time, during execution of the blockage recovery process in response to determination by the first blockage risk state determination part, and start a temperature increase failure recovery mode for starting determination of the blockage risk state by the second blockage risk state determination part if the blockage recovery process is executed under the temperature increase failure successively a first number of times.

With the above configuration (6), it is determined whether the temperature of the DOC is increased appropriately in the blockage recovery process. If the temperature of the DOC is not increased appropriately, substances adhering to the upstream end surface of the DOC, such as SOF or soot of non-combusted fuel, are not combusted sufficiently by the blockage recovery process, and the DOC is not recovered appropriately. Thus, if the blockage recovery process of the temperature increase failure is executed successively the first number of times, determination of the blockage risk state by the second blockage risk state determination part is started, and thereby it is possible to prevent blockage of the DOC in advance.

(7) In some embodiments, in the above configuration (6), the second threshold is set such that an average time interval between two successive blockage recovery processes executed in response to determination by the second blockage risk state determination part is shorter than an average time interval between two successive blockage recovery processes executed in response to determination by the first blockage risk state determination part.

With the above configuration (7), in two blockage recovery processes executed in response to determination by the first blockage risk state determination part, after completion of the first blockage recovery process and before the second blockage recovery process is executed, the blockage recovery process is executed in response to determination by the second blockage risk state determination part. Thus, in the blockage recovery process executed in response to determination by the first blockage risk state determination part, even if there is a blockage recovery process under a temperature increase failure where the temperature of the DOC is not appropriately is increased due to some factor and the DOC is not recovered appropriately, the blockage recovery process is executed in response to determination by the second blockage risk state determination part, and thus it is possible to execute the blockage recovery process at a more suitable frequency and recover the DOC appropriately.

(8) In some embodiments, in any one of the above configurations (6) to (7), the mode start part is configured to end the temperature increase failure recovery mode if the temperature of the DOC in the blockage recovery process executed after the temperature increase failure recovery mode is started is greater than the first temperature threshold.

With the above configuration (8), after the temperature increase failure recovery mode is started, if recovery of the DOC is performed appropriately by the blockage recovery process again, the temperature increase failure recovery mode is terminated. Accordingly, the blockage risk state of the DOC is determined by another determination part such as the first blockage risk state determination part, and thereby it is possible to prevent blockage of the DOC in advance. Furthermore, the frequency of the blockage recovery process is changed back to the normal frequency, and thereby it is possible to prevent deterioration of the fuel efficiency.

(9) In some embodiments, in any one of the above configurations (6) to (8), the regeneration control device further includes a first notification part configured to notify that the blockage recovery process is performed under the temperature increase failure successively a second number of times, the second number being greater than the first number, or notify to prompt manual execution of the blockage recovery process if the blockage recovery process is performed under the temperature increase failure successively the second number of times.

With the above configuration (9), in a case where the blockage recovery process is executed under temperature increase failure successively the second number of times, it is possible to notify an operator that it is necessary to change the blockage recovery process execution condition.

(10) In some embodiments, in any one of the above configurations (6) to (9), the DOC blockage risk state determination part includes a determination threshold correction part configured to correct the second threshold on the basis of at least one of an atmospheric pressure, an atmospheric temperature, or a water temperature of the diesel engine.

With the above configuration (10), while the blockage speed of the DOC depends on the external environment in which the diesel engine is situated, it is possible to prevent blockage of the DOC in advance through the blockage recovery process, by correcting the second threshold appropriately in accordance with the external environment estimated from the atmospheric pressure, the atmospheric temperature, or the water temperature of the diesel engine.

(11) In some embodiments, in any one of the above configurations (1) to (10), the counter value includes a third counter value which is an accumulated operation time of the diesel engine. The threshold includes a third threshold corresponding to the third counter value. The DOC blockage risk state determination part includes a third blockage risk state determination part configured to determine that the DOC is in the blockage risk state if the third counter value is greater than the third threshold. The counter reset process part is configured to reset the counter value including the third counter value, after completion of the blockage recovery process executed in response to determination by the third blockage risk state determination part.

With the above configuration (11), in a case where the diesel engine is operated in an environment where blockage of the DOC is likely to occur, such as highlands, the regeneration control device for the exhaust gas treatment device can prevent blockage of the DOC in advance by executing the blockage recovery process on the basis of the accumulated operation time.

(12) In some embodiments, in the above configuration (11), the DOC blockage risk state determination part includes a determination threshold correction part configured to correct the third threshold on the basis of at least one of an atmospheric pressure, an atmospheric temperature, or a water temperature of the diesel engine.

With the above configuration (12), while the blockage speed of the DOC depends on the external environment in which the diesel engine is situated, it is possible to prevent blockage of the DOC in advance through the blockage recovery process, by correcting the third threshold appropriately in accordance with the external environment estimated from the atmospheric pressure, the atmospheric temperature, or the water temperature of the diesel engine.

(13) In some embodiments, in any one of the above configurations (5) to (12), the regeneration control device for an exhaust gas treatment device further includes a blockage recovery process condition correction part configured to, in two successive blockage recovery processes, correct a temperature-increase temperature or a temperature-increase execution period in the blockage recovery process which is executed later, on the basis of the temperature of the DOC in the blockage recovery process which is executed earlier.

With the above configuration (13), on the basis of the temperature of the DOC in the previous blockage recovery process that completes earlier, the blockage recovery process execution condition of the next blockage recovery process to be executed later is corrected, and thereby it is possible to recover the DOC reliably through the later blockage recovery process.

(14) In some embodiments, in any one of the above configurations (1) to (13), the DPF forced regeneration execution part is configured to execute the forced regeneration process after completion of the blockage recovery process, if the forced regeneration execution condition is satisfied after completion of the blockage recovery process by the DOC temperature increase execution part.

With the above configuration (14), during execution of the blockage recovery process started in response to determination that the forced regeneration execution condition is not satisfied and the DOC is in the blockage risk state (the blockage recovery process execution condition is satisfied), even if the forced regeneration execution condition becomes satisfied, the forced regeneration process is executed after completion of the blockage recovery process. As described above, both of the forced regeneration process of the DPF and the blockage recovery process of the DOC are executed, and thus it is possible to efficiently execute recovery of the DOC and regeneration of the DPF. Furthermore, in addition to preventing blockage of the DOC in advance, it is possible to prevent slip of non-combusted fuel due to blockage of the DOC and prevent deterioration of fuel efficiency, burn damage to the DPF, and oil dilution, for the DOC is recovered first before executing forced regeneration of the DPF.

(15) In some embodiments, in any one of the above configurations (1) to (14), the DOC temperature increase execution part is configured to interrupt the blockage recovery process if an interruption condition of the blockage recovery process in execution is satisfied.

With the above configuration (15), during execution of the blockage recovery process, failure of an appropriate temperature increase of the DOC due to some factor is detected with the interruption condition, and thereby the blockage recovery process is interrupted without waiting for normal completion after satisfying the completion condition. Accordingly, it is no longer necessary to wait for completion of the blockage recovery process for long time, which makes it possible to quickly address occurrence of an event corresponding to the interruption condition.

(16) In some embodiments, in the above configuration (15), the DOC temperature increase execution part is configured to execute the blockage recovery process after elapse of a retry time, if the blockage recovery process is interrupted.

With the above configuration (16), the interrupted blockage recovery process is executed again after interruption, and thereby it is possible to prevent blockage of the DOC in advance.

(17) In some embodiments, in any one of the above configurations (15) to (16), the regeneration control device for an exhaust gas treatment device further includes a second notification part configured to, if the blockage recovery process is interrupted a predetermined number of times, notify that the blockage recovery process is interrupted the predetermined number of times, or notify to prompt manual execution of the blockage recovery process.

With the above configuration (17), it is possible to prompt an operator, for instance, to execute the blockage recovery process manually. Further, with the blockage recovery process performed manually in response to the notification, it is possible to prevent blockage of the DOC in advance.

(18) In some embodiments, in any one of the above configurations (1) to (17), the DPF forced regeneration condition determination part is configured to determine that the forced regeneration execution condition is satisfied, if an estimate value of a PM accumulation amount at the DPF is greater than a predetermined value, if an operation time of an engine is longer than a predetermined time, or if an accumulated value of a fuel injection amount of the diesel engine is greater than a predetermined amount.

With the above configuration (18), it is possible to appropriately execute the forced regeneration process of the DPF with determination using the forced regeneration execution condition.

(19) In some embodiments, in any one of the above configurations (1) to (18), the DPF forced regeneration execution part is configured to interrupt the forced regeneration process if an abnormally high temperature of the DPF is detected during execution of the forced regeneration process. The DOC temperature increase execution part is configured to execute the blockage recovery process for a longer execution period if the forced regeneration process is interrupted in response to detection of the abnormally high temperature of the DPF, compared to a case where the abnormally high temperature of the DPF is not detected.

With the above configuration (19), the forced regeneration process is interrupted if an abnormally high temperature of the DPF is detected during execution of the forced regeneration process, and thereby it is possible to protect the DPF from burn damage or the like. Further, an abnormally high temperature of the DPF may be due to blockage of the DOC. Thus, by executing the blockage recovery process for a longer period of time after detecting an abnormally high temperature of the DPF, it is possible to recover blockage of the DOC.

Advantageous Effects

According to at least one embodiment of the present invention, provided is a regeneration control device whereby it is possible to prevent blockage of DOC in advance, and perform recovery of DOC and regeneration of DPF efficiently.

BRIEF DESCRIPTION OF DRAWINGS

FIG. 5 is a diagram showing transition of temperatures of DOC and DPF, corresponding to the control logic of a regeneration recovery process in FIG. 4.

FIG. 7 is a diagram showing a control logic of a regeneration recovery process of a regeneration control device according to an embodiment of the present invention, where a blockage recovery process is executed on the basis of determination by the first blockage risk state determination part.

FIG. 8 is a diagram showing a control logic of a regeneration recovery process of a regeneration control device according to an embodiment of the present invention, where a blockage recovery process is executed on the basis of determination by the third blockage risk state determination part.

FIG. 9 is a diagram showing a control logic of a regeneration recovery process of a regeneration control device according to an embodiment of the present invention, where a blockage recovery process is executed on the basis of determination by the first blockage risk state determination part and the second blockage risk state determination part.

FIG. 10 is a diagram showing a control logic of a regeneration recovery process of a regeneration control device according to an embodiment of the present invention, where a blockage recovery process is executed on the basis of determination by the second blockage risk state determination part and determination by the third blockage risk state determination part.

DETAILED DESCRIPTION

Embodiments of the present invention will now be described in detail with reference to the accompanying drawings. It is intended, however, that unless particularly identified, dimensions, materials, shapes, relative positions and the like of components described in the embodiments shall be interpreted as illustrative only and not intended to limit the scope of the present invention.

For instance, an expression such as "comprise", "include", "have", "contain" and "constitute" are not intended to be exclusive of other components.

Figure 1:
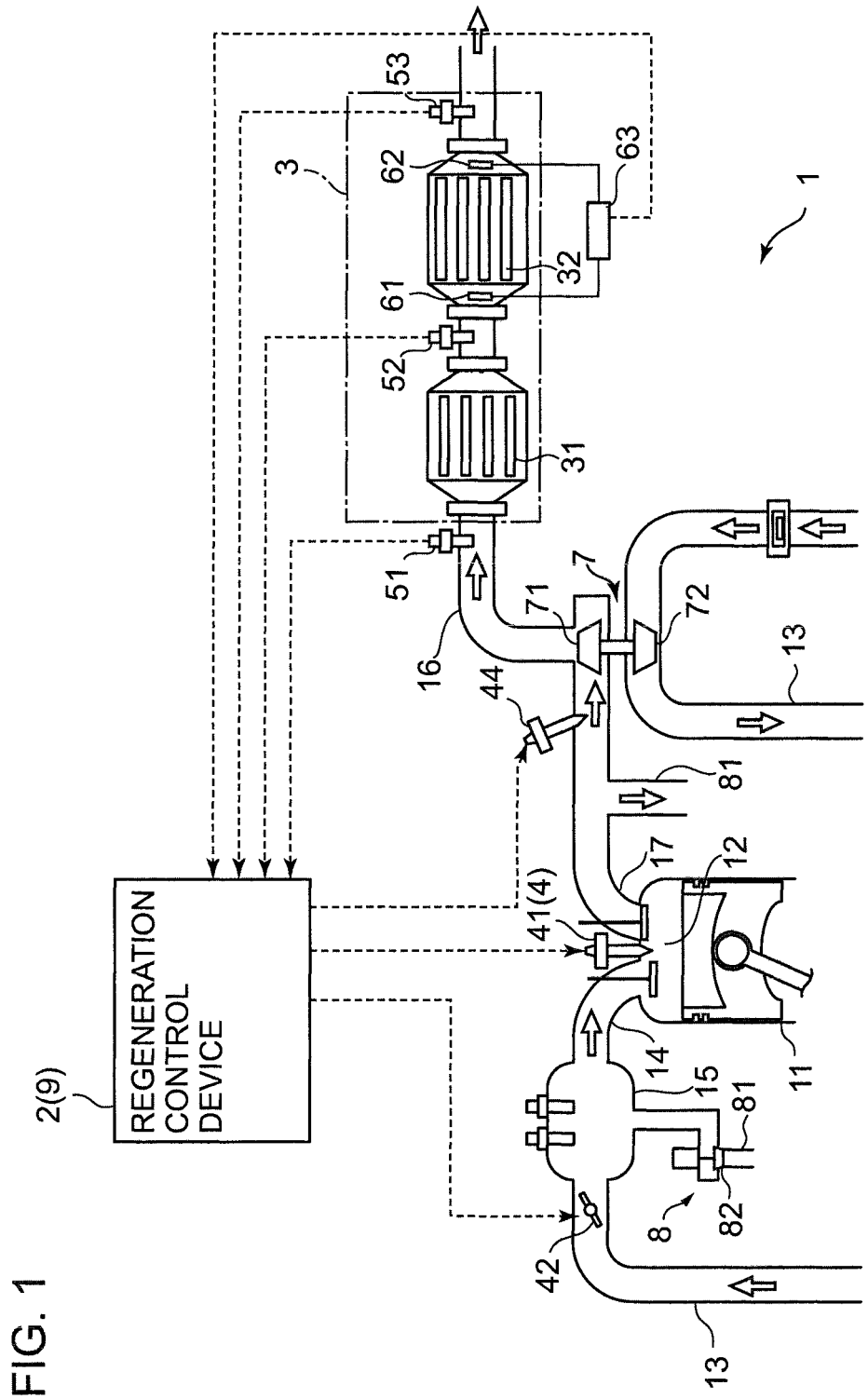
FIG. 1 is an overall configuration diagram of a diesel engine including a regeneration control device with DOC, according to an embodiment of the present invention.
Figure 2:
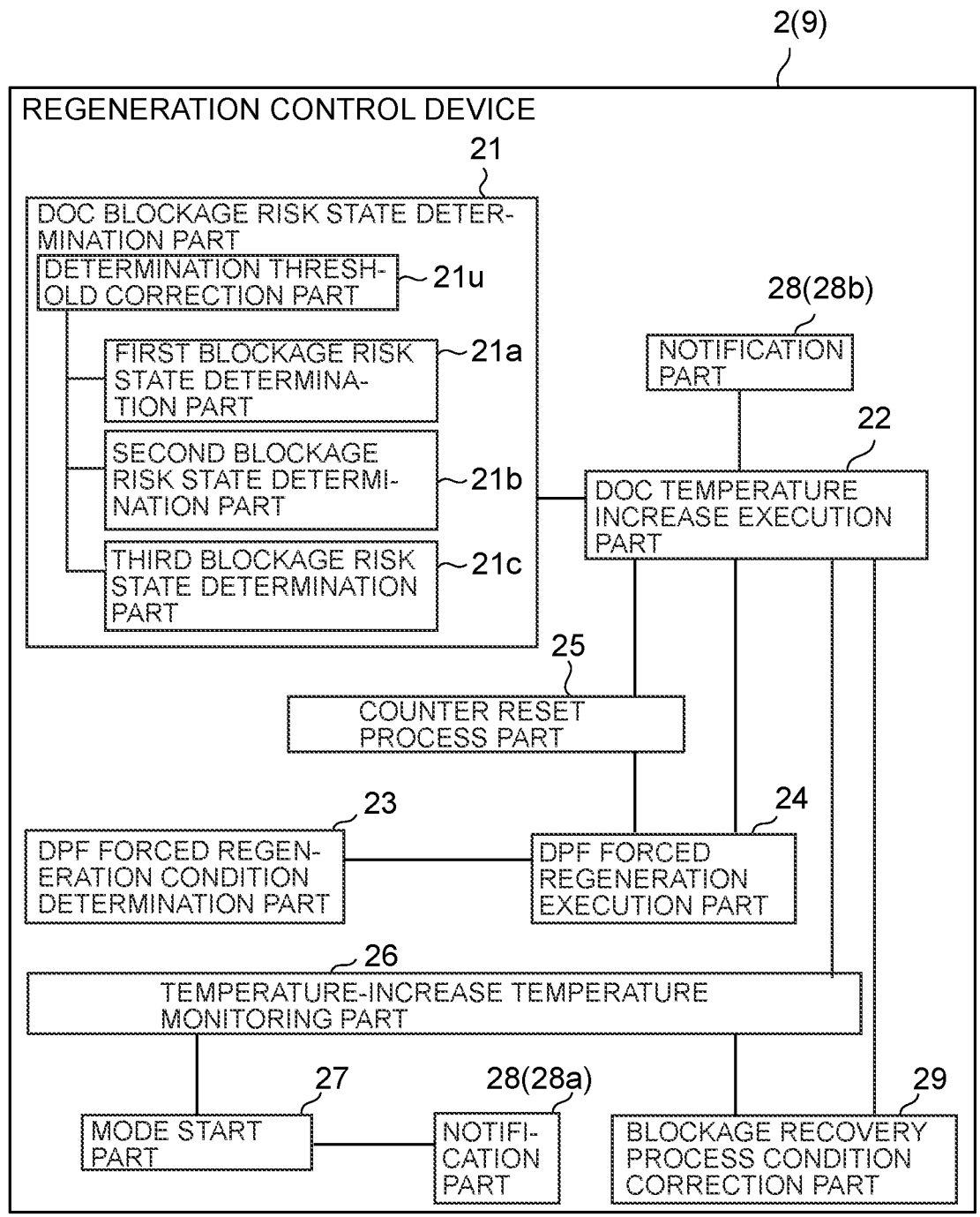
FIG. 2 is a functional block diagram of a regeneration control device according to an embodiment of the present invention.

FIG. 1 is an overall configuration diagram of a diesel engine 1 including a regeneration control device 2 which controls regeneration of an exhaust gas treatment device 3, according to an embodiment of the present invention. FIG. 2 is a functional block diagram of a regeneration control device 2 according to an embodiment of the present invention. As described below, the exhaust gas treatment device 3 includes a DOC 31 and a DPF 32. The regeneration control device 2 performs regeneration (recovery) of the exhaust gas treatment device 3 disposed in the exhaust passage 16 of the diesel engine 1, by controlling a temperature increase unit 4 (described below) of the exhaust gas treatment device 3.

First, a diesel engine 1 (hereinafter, also referred to as engine 1) including a regeneration control device 2 for an exhaust gas treatment device according to an embodiment of the present invention (hereinafter, merely referred to as regeneration control device 2), will be described. In the embodiment shown in FIG. 1, as shown in the drawings, the diesel engine 1 mainly includes an engine body 11, an intake passage 13, an exhaust passage 16, an exhaust turbocharger 7, an EGR device 8, and an ECU 9, in addition to the regeneration control device 2 and the exhaust gas treatment device 3 described above.

To the engine body 11, the intake passage 13 and the exhaust passage 16 are connected. The intake passage 13 is a passage for supplying air outside the engine 1 (intake air) to a combustion chamber 12 formed on the engine body 11. The exhaust passage 16 is a passage for discharging combustion gas (exhaust gas) from the combustion chamber 12 to the outside of the engine 1. Further, the engine 1 includes a fuel injection device 41 for injecting high-pressure fuel to the combustion chamber 12. The fuel injection device 41 is connected to a common rail (not depicted) accumulating the high-pressure fuel, and the ECU 9 described below controls the injection timing and the fuel injection amount of the fuel injection device 41. The high-pressure fuel injected into the combustion chamber 12 is mixed with intake air that is supplied through the intake passage 13, combusted in the combustion chamber 12, and is discharged out of the engine 1 through the exhaust passage 16.

In the example shown in FIG. 1, the exhaust turbocharger 7 is disposed in the intake passage 13 and the exhaust passage 16. The exhaust turbocharger 7 includes an exhaust turbine 71 disposed in the exhaust passage 16 and a compressor 72 disposed in the intake passage 13, and the exhaust turbine 71 and the compressor 72 are coupled via a shaft 73 coaxially. Further, as exhaust gas passing through the exhaust passage 16 rotary drives the exhaust turbine 71, the compressor 72 coaxially coupled to the exhaust turbine 71 via the shaft 73 is also rotary driven. Further, an inter cooler (not depicted) and the throttle valve 42 are disposed in the intake passage 13. The inter cooler (not shown) cools the compressed intake air discharged from the compressor 72, then the throttle valve 42 controls the intake flow rate, and then the compressed intake air flows into the combustion chamber 12 of each cylinder of the engine 1 via the intake port 14 disposed on the body (cylinder head, although not shown) of the engine 1. The opening degree of the throttle valve 42 is controlled by the ECU 9 described below.

Further, in the example shown in FIG. 1, the engine 1 includes an EGR device 8.

That is, the intake passage 13 and the exhaust passage 16 are coupled via an EGR pipe 81, such that a part of exhaust gas that flows through the exhaust passage 16 can be recirculated to the intake passage 13. In the example shown in FIG. 1, an end of the EGR pipe 81 is connected to an immediately downstream position of the exhaust port 17, and the EGR pipe 81 branches from the exhaust passage 16. Further, the other end of the EGR pipe 81 is connected to an intake manifold 15 (intake passage 13) disposed on the downstream side of the throttle valve 42. Further, an EGR valve 82 is disposed in the EGR pipe 81. By controlling the EGR valve 82, at least a part of exhaust gas discharged from the engine 1 flows through the EGR pipe 81 and recirculates through the engine 1. The opening degree of the EGR valve 82 is also controlled by the ECU 9 described below.

In short, in the embodiment shown in FIG. 1, a part of exhaust gas discharged from the engine body 11 (combustion chamber 12) is recirculated to the intake passage 13 by the EGR device 8 under control of the ECU 9. Further, the rest of exhaust gas discharged from the engine body 11 flows through the exhaust port 17 and drives the exhaust turbine 71 described above, then flowing into the exhaust gas treatment device 3 disposed in the exhaust passage 16.

The exhaust gas treatment device 3 includes a diesel oxidation catalyst (DOC) 31 disposed in the exhaust passage 16 of the diesel engine 1, and a diesel particulate filter (DPF) 32 disposed in the exhaust passage 16 downstream of the DOC 31. The DOC 31 has a function to oxidize and remove non-combusted fuel (HC) and carbon monoxide (CO) from exhaust gas and to oxidize nitrogen monoxide (NO) in the exhaust gas to produce nitrogen dioxide ($NO_2$). Further, the DOC 31 increases the temperature of passing exhaust gas with oxidation heat of injected fuel upon forced regeneration or the like of the DPF 32, for instance, to increase the inlet temperature of the DPF 32. Further, the DPF 32 is a device which collects particulate matters (PM), such as soot, contained in exhaust gas with a filter to remove the particulate matters from exhaust gas. That is, exhaust gas after flowing into the exhaust gas treatment device 3 passes through the DOC 31 inside the exhaust gas treatment device 3, and then passes through the DPF 32. Upon this passage, the DOC 31 oxidizes and removes the non-combusted fuel (HC) and carbon monoxide (CO) from exhaust gas. Further, the DPF 32 collects PM (particulate matters) contained in the exhaust gas, thereby removing PM from exhaust gas. After being treated by the exhaust gas treatment device 3 as described above, exhaust gas is discharged out of the engine 1.

The ECU 9 is an electronic control unit which performs various controls on the engine 1, such as the above described fuel injection control, an opening degree control for the throttle valve 42, and the opening degree control for the EGR valve 82. For instance, the ECU 9 may be configured as a microcomputer including a central processing unit (CPU) that includes a processor, a random access memory (RAM), a read only memory (ROM), and an I/O interface.

Further, as shown in FIG. 1, various sensors are disposed in the exhaust passage 16. Further, the detection values of the various sensors are input into a regeneration control device 2 described below, to monitor the state of exhaust gas or the state of the exhaust gas treatment device 3 with the regeneration control device 2. In the embodiment shown in FIG. 1, a DOC inlet temperature sensor 51 is disposed on the inlet of the DOC 31, to detect the temperature of exhaust gas flowing into the DOC 31. Further, various sensors are disposed in the exhaust passage 16; the sensors include temperature sensors 5 including a DPF inlet temperature sensor 52 disposed on the inlet of the DPF 32 (between the DOC 31 and the DPF 32) and a DPF outlet temperature sensor 53 disposed on the outlet of the DPF 32, and pressure sensors 6 including a DPF inlet pressure sensor 61 disposed on the inlet of the DPF 32, a DPF outlet pressure sensor 62 disposed on the outlet of the DPF 32, and a DPF differential pressure sensor 63 capable of detecting a differential pressure between the inlet and the outlet of the DPF 32. In the embodiment shown in FIG. 1, the temperature of the DOC 31 is detected on the basis of the detection value of the DOC inlet temperature sensor 51, and the temperature of the DPF 32 is detected on the basis of the detection value of the DPF inlet temperature sensor 52.

Further, the regeneration control device 2 according to an embodiment of the present invention is disposed in the diesel engine 1 as shown in FIG. 1, for instance, and performs recovery of the DOC 31 disposed in the exhaust passage 16 of the diesel engine 1 (blockage recovery process Rc) and forced regeneration of the DPF 32 disposed in the exhaust passage 16 downstream of the DOC 31 (forced regeneration process Rf). In the embodiment shown in FIG. 1, the regeneration control device 2 is the ECU 9, and is implemented as one of the functions (program or circuit) of the ECU 9. Alternatively, in some embodiments, the regeneration control device 2 may be configured as an electronic control unit including a processor, independently from the ECU 9 for controlling the engine 1.

Next, regeneration of the DPF 32 will be described. As described above, when exhaust gas passes through the exhaust gas treatment device 3, PM (particulate matter) in exhaust gas is collected by the DPF 32. If exhaust gas discharged from the engine body 11 (combustion chamber 12) in operation has a high temperature, PM collected by the DPF 32 is combusted by the high-temperature exhaust gas, and is removed naturally (natural regeneration). However, PM that has not been removed by natural regeneration accumulates on the filter of the DPF. Excessive accumulation of PM may bring about a decrease in the PM collecting performance and a decrease in the engine output, for instance. Thus, in the exhaust gas treatment device 3 including the DPF 32, by performing forced regeneration at an appropriate timing, it is possible to combust PM that accumulates on the filter of the DPF 32 forcedly, and regenerate the DPF 32. Further, the forced regeneration process Rf can be classified into at least two types, by its starting trigger. That is, there are at least two types of forced regeneration: automatic regeneration executed automatically; and manual regeneration executed manually by an operator or the like.

The automatic regeneration of the DPF 32 is automatically executed if predetermined forced-regeneration execution conditions (automatic regeneration execution conditions) are satisfied, regardless of whether the vehicle is moving or standing. The forced regeneration execution conditions may include, for instance: an estimate value of the PM accumulation amount on the DPF 32 exceeding a predetermined value (threshold); the operation time of the engine 1 exceeding a predetermined period of time (threshold); and an accumulated fuel injection amount of the engine 1 exceeding a predetermined amount (threshold). The PM accumulation amount on the DPF 32 can be estimated by detecting a differential pressure between the upstream and downstream sides of the DPF 32 with the DPF differential pressure sensor 63, for instance. Alternatively, the PM accumulation amount can be also estimated by detecting the engine rotation speed, the fuel injection amount, the air flow rate, and the DPF temperature (e.g. detection value of the DPF outlet temperature sensor 53), estimating the PM regeneration amount inside the DPF 32 by natural regeneration and the PM discharge amount from the engine 1 on the basis of the map stored in advance in the regeneration control device 2, and subtracting the PM regeneration amount from the PM discharge amount.

The manual regeneration of the DPF 32 is executed by, for instance, button operation of an operator or the like being a forced regeneration execution condition (manual regeneration execution condition), basically while the vehicle is standing. The manual regeneration execution condition is performed if PM is accumulated over the automatic regeneration condition, including a case where the estimate value of the PM accumulation amount is greater than a predetermined value that is greater than that in automatic regeneration. Further, the above manual regeneration may include combustion removal by a maintenance personnel at the time when PM is accumulated on the DPF 32 excessively (DPF recovery regeneration). In this case (DPF recovery regeneration), forced regeneration is performed for a longer period of time than for normal manual regeneration, to avoid an excessive temperature increase of the DPF 32. Further, the two types of regenerations also differ in terms of the temperature upon execution of forced regeneration; the regeneration temperature is higher in the manual regeneration than in the automatic regeneration. For example, the inlet temperature of the DPF 32 is 600 to 610° C. in the automatic regeneration, and is 620 to 630° C. in the manual regeneration. As described above, the first temperature T1 (e.g. 400° C.) is lower than the second temperature T2 (e.g. 600° C. or higher).

Further, recovery of the DOC 31 will be described. If the operation load of the engine 1 and the exhaust gas temperature are low continuously, SOF or soot of non-combusted fuel or the like adheres to an upstream end surface of the DOC, and blockage of the DOC gradually progresses. If the DOC 31 becomes blocked, the back pressure may increase and the fuel efficiency may deteriorate, as described above. Further, if the DOC 31 becomes blocked, upon execution of forced regeneration of the DPF 32, the fuel efficiency may deteriorate due to injection of an excess amount of fuel that is injected to increase the inlet temperature of the DPF 32 to a predetermined temperature. Furthermore, blockage of the DOC 31 may cause slip of non-combusted fuel which may raise the risk of burn damage of the DPF 32, and may increase the risk of oil dilution in a case where the temperature increases due to late-post injection described below. That is, the problems raised by blockage of the DOC 31 described above are due to substances adhering to the DOC 31 and cause blockage of the DOC 31, which can be removed by increasing the temperature of the DOC 31.

Thus, the regeneration control device 2 recovers the DOC 31 by performing the blockage recovery process Rc on the DOC 31, and combusting and removing substances adhering to the DOC 31. Further, the regeneration control device 2 regenerates the DPF 32 by executing the forced regeneration process Rf on the DPF 32 and combusting PM collected by the DPF 32. To perform recovery of the DOC 31 and regeneration of the DPF 32 as described above, as shown in FIG. 2, the regeneration control device 2 includes a DOC blockage risk state determination part 21, a DOC temperature increase execution part 22, a DPF forced regeneration condition determination part 23, a DPF forced regeneration execution part 24, and a counter reset process part 25.

Figure 3:
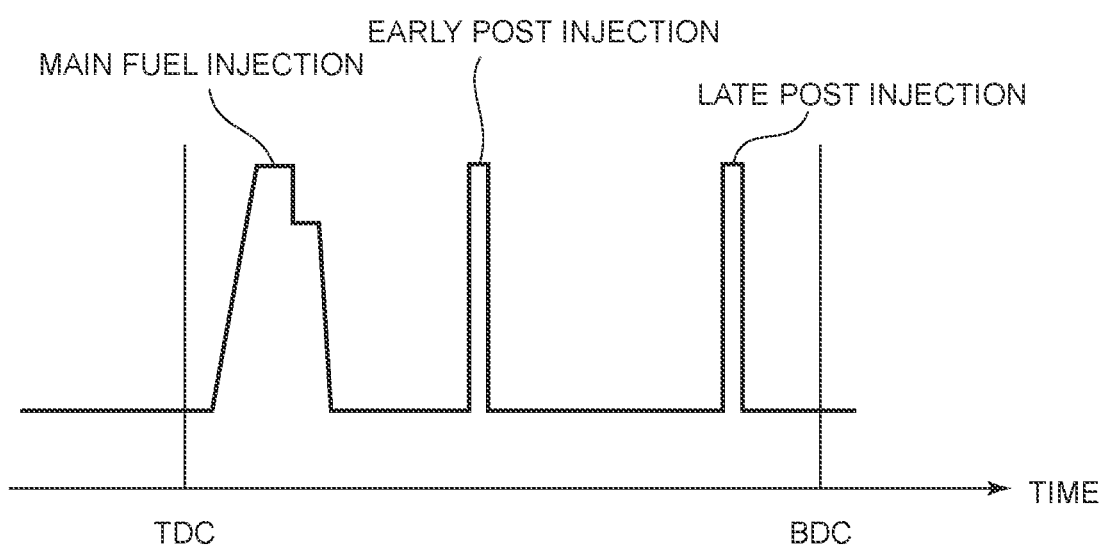
FIG. 3 is a diagram for describing a forced regeneration process of DPF performed by early-post injection and late-post injection according to an embodiment of the present invention.
Figure 4:
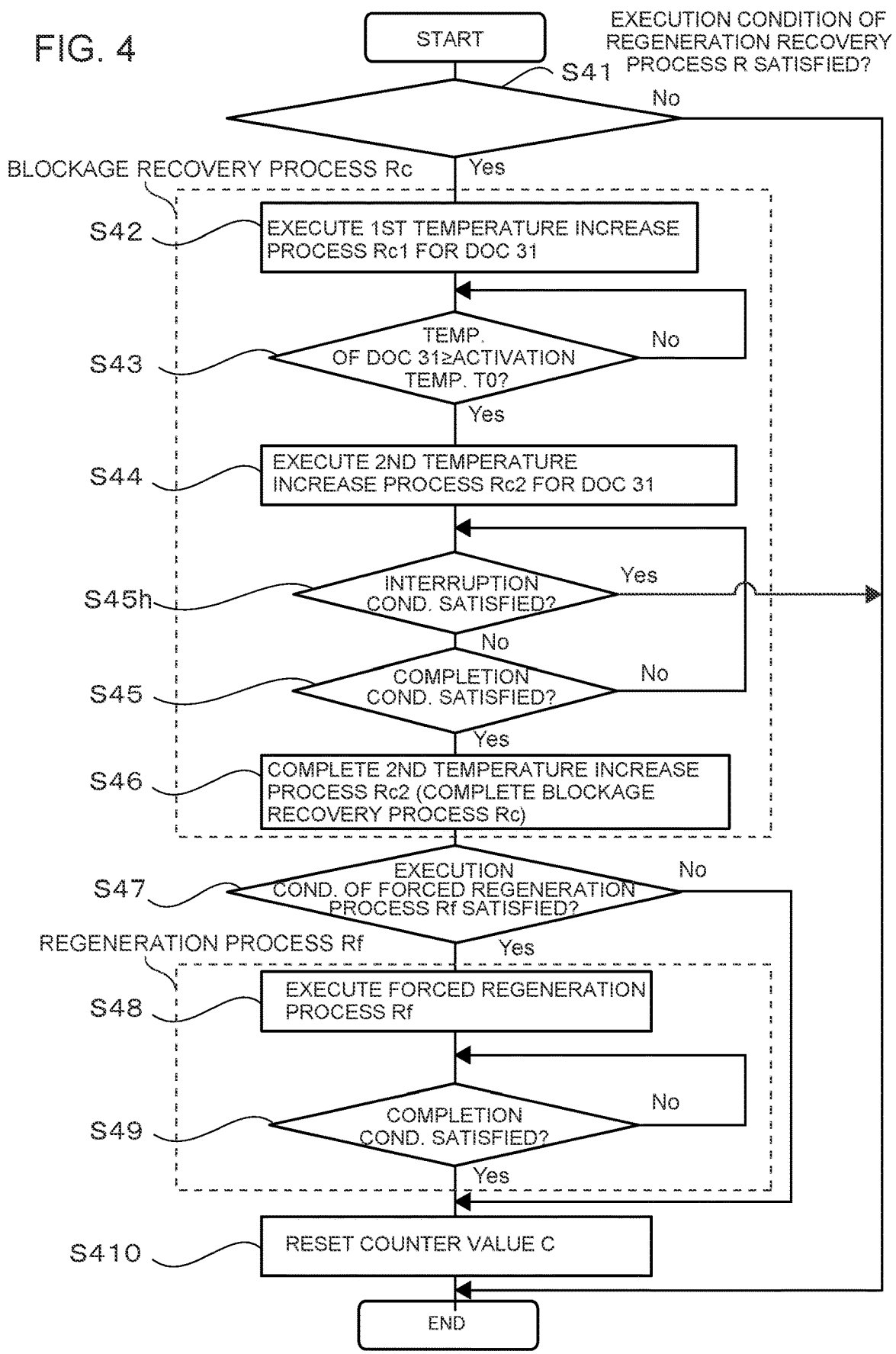
FIG. 4 is a diagram showing a control logic of a regeneration control device according to an embodiment of the present invention

Hereinafter, each component of the regeneration control device 2 will be described with reference to FIGS. 1 to 5. FIG. 3 is a diagram for describing a forced regeneration process Rf of the DPF 32 performed by early-post injection and late-post injection according to an embodiment of the present invention. FIG. 4 is a diagram showing a control logic of a regeneration recovery process R by the regeneration control device 2 according to an embodiment of the present invention. FIG. 5 is a diagram showing transition of temperatures of the DOC 31 and the DPF 32, corresponding to the control logic of the regeneration recovery process R in FIG. 4. Further, the regeneration recovery process R executed by the regeneration control device 2 is a process for executing recovery of the DOC 31 and forced regeneration of the DPF 32.

The DOC blockage risk state determination part 21 determines whether the DOC 31 is in a blockage risk state D1, that is a state where blockage of the DOC 31 is likely to occur, on the basis of comparison between the counter value C and the threshold V related to operation time of the diesel engine I. In other words, the blockage risk state D1 of the DOC 31 is a state where the risk of blockage of the DOC 31 can be estimated from the operation state of the engine 1, and is detected if the diesel engine 1 is under an operational state where blockage of the DOC 31 is likely to occur. The blockage risk state D1 of the DOC 31 can be determined by a variety of methods.

In the embodiment shown in FIGS. 1 to 5, the counter value C includes the first counter value C, which is an accumulated duration time within a predetermined period closest to a low exhaust temperature operation state in which the temperature of exhaust gas discharged from the diesel engine 1 is below an exhaust temperature threshold. Further, the DOC blockage risk state determination part 21 includes a first blockage risk state determination part 21a which determines that the DOC 31 is in the blockage risk state D1, if the first counter value C1 is greater than the first threshold V1, as shown in FIG. 1. The exhaust temperature threshold is a threshold for determining an operation state of the engine 1 in which blockage of the DOC 31 develops gradually, on the basis of the exhaust gas temperature. If the exhaust gas temperature is continuously lower than the exhaust temperature threshold, that is, if a low exhaust temperature operation state continues, blockage of the DOC develops gradually. On the other hand, once the exhaust gas temperature exceeds the exhaust temperature threshold, that is, enters a high exhaust temperature operation state, blockage of the DOC starts to be removed. Thus, with the above configuration, by determining the blockage risk state D1 of the DOC 31 with the accumulated duration time of the low exhaust temperature operation state in a closest predetermined time, it is possible to determine the blockage risk state D1 of the DOC 31 accurately. Further, it is possible to prevent blockage (blockage state) of the DOC 31 in advance.

In some embodiments, during normal operation, it may be determined that the DOC 31 is in the blockage risk state D1, if one of the following conditions are satisfied: if the first counter value C1 is continuously observed for a predetermined time (first threshold V1) or longer, the first counter value C1 measuring a continuous duration time of a case in which the temperature of exhaust gas is not higher than a predetermined temperature; if the first counter value C1 is continuously greater for a predetermined time (first temperature V1) or longer, the first counter value C1 measuring a continuous duration time of a case in which the number of times when the variation rate of the engine rotation speed of the engine 1 exceeds a predetermined rotation speed threshold per unit time; or if the first counter value C1 is continuously observed for a predetermined period (first temperature V1) or longer, the first counter value C1 measuring a continuous duration time of a case in which the average of the PM discharge amount estimate value is continuously not less than a threshold. Furthermore, in other some embodiments, it may be determined that the DOC 31 is in the blockage risk state D1 if one or more of the above described determination methods are satisfied.

Furthermore, in the embodiment shown in FIGS. 1 to 5, the counter value C includes the second counter value C2 and the third counter value C3, which are each an accumulated operation time of the diesel engine 1. Further, as shown in FIG. 2, the DOC blockage risk state determination part includes, in addition to the first blockage risk state determination part 21a, a second blockage risk state determination part 21b which determines that the DOC 31 is in the blockage risk state D1 if the second counter value C2 is greater than the second threshold V2, and a third blockage risk state determination part 21c which determines that the DOC 31 is in the blockage risk state D1 if the third counter value C3 is greater than the third threshold V3. That is, the regeneration control device 2 of the embodiment shown in FIG. 1 is capable of determining whether the DOC 31 is in the blockage risk state D1, on the basis of each of the plurality of counter values C (C1 to C3) that the counter value C includes. Further, in some embodiments, the counter value C may include at least one of the counter value C1, the second counter value C2, or the third counter value C3, and at least one counter value thereof may be used to execute determination of whether the DOC 31 is in the blockage risk state D1.

The DOC temperature increase execution part 22 executes, if it is determined that the DOC 31 is in the blockage risk state D1, a blockage recovery process Rc (DOC blockage recovery regeneration) for increasing the temperature of the DOC 31 to the first temperature T1. As shown in FIG. 2, the DOC temperature increase execution part 22 is connected to the DOC blockage risk state determination part 21, and the determination result obtained by the DOC blockage risk state determination part 21 is input to the DOC temperature increase execution part 22. The first temperature T1 is preferably around 400° C. Specifically, the first temperature T1 may be a temperature from 380° C. to 480° C. The temperature range of the first temperature T1 is a temperature set on the basis of a new finding that substances adhering to the upstream end surface of the DOC 31 burn when the temperature of the DOC 31 is increased to the first temperature T1. In the embodiment shown in FIGS. 1 to 5, the regeneration control device 2 is configured to execute the blockage recovery process Rc in accordance with a blockage recovery process execution condition Pc including a target temperature-increase temperature Pct, which is set to the first temperature T1, and a temperature-increase execution period Pcp.

In some embodiments, the DOC temperature increase execution part 22 may forcedly complete a blockage recovery process Rc in execution by interruption, if the following interruption condition is satisfied, for instance. If the blockage recovery process Rc is interrupted by some factor, the regeneration control device 2 may execute a retry control to execute the blockage recovery process Rc again after elapse of a predetermined time (retry time), i.e. after a few minutes. In the retry control, the blockage recovery process Rc may be executed from the beginning in accordance with the blockage recovery process execution condition Pc, or the blockage recovery process Rc may be executed so as to satisfy a time set to have the DOC 31 at the first temperature T1 for a predetermined time in the blockage recovery process Rc (time t3 to time t4 in FIG. 5) with both of the interrupted blockage recovery process Rc and the blockage recovery process Rc executed by the retry control.

Alternatively, if the above interruption is performed a predetermined number of times that is more than once, the notification part 28 (second notification part 28b) of the regeneration control device 2 may notify that the blockage recovery process Rc is interrupted the predetermined number of times, or notify an operator to prompt manual execution of the blockage recovery process Rc for increasing the temperature of the DOC 21 to a temperature higher than that in the automatic blockage recovery process Rc performed by the regeneration control device 2. The manual blockage recovery process Rc is, for instance, performed by operation of a manual regeneration button by an operator, for instance. Alternatively, as described below, the regeneration control device 2 may execute the forced regeneration process Rf if the execution condition of the forced regeneration process Rf is satisfied upon interruption (forced completion) of the blockage recovery process Rc (see step S47 in FIG. 4). Accordingly, it is possible to ensure reliable execution of the blockage recovery process Rc in case the blockage risk state D1 is determined. Further, the temperature-increase execution period Pcp may be an execution period from start to completion of the blockage recovery process Rc (time t2 to time t4 in FIG. 5).

In the embodiment shown in FIGS. 1 to 5, the blockage recovery process Rc includes a first temperature increase process Rc1 to control the temperature increase unit 4 (described below) so as to increase the temperature of the DOC 31 to an activation temperature T0 (e.g. 250° C.) at which the DOC 31 activates, and a second temperature increase process Rc2 to control the temperature increase unit 4 (described below) so as to increase the temperature of the DOC 31 to the first temperature T1 that is higher than the activation temperature T0. The first temperature increase process Rc1 and the second temperature increase process Rc2 are executed in this order. As described above, by increasing the temperature of the DOC 31 in two stages, it is possible to prevent progress of the DOC blockage state D2 due to fuel injected to increase the temperature of the DOC 31 to the first temperature T1 before activation of the DOC 31, and to suppress discharge of HC while combusting and removing substances adhering to the DOC 31. Nevertheless, the blockage recovery process Rc is not limited to the above technique. For instance, in some embodiments, the temperature increase unit 4 (described below) may be controlled so as to increase the temperature of the DOC 31 at once to the first temperature T1 with the second temperature increase process Rc2, from the start of the blockage recovery process Rc.

In the embodiment shown in FIGS. 1 to 5, the temperature increase unit 4 used in the blockage recovery process Rc includes a fuel injection device 41 which injects fuel to the combustion chamber 12 of the diesel engine 1. Further, the first temperature increase process Rc1 and the second temperature increase process Rc2 are executed by the early post injection of the fuel injection device 41. The early-post injection is the first post injection of injecting a smaller amount of fuel than main injection while the pressure in the combustion chamber 12 is still high immediately after injection of the main fuel, in the step of injecting fuel in the engine 1 (see FIG. 3). The early-post injection makes it possible to increase the exhaust-gas temperature without affecting the output of the diesel engine 1. Further, the first temperature increase process Rc1 and the second temperature increase process Rc2 have different fuel injections for the early post injection. With the injection condition of the first temperature increase process Rc1 being switched to the injection condition of the second temperature increase process Rc2, the DOC 31 having a temperature increased to the activation temperature T0 is further heated to have its temperature increased to the first temperature T1. Specifically, the fuel injection amount is greater in the second temperature increase process Rc2 than in the first temperature increase process Rc1, or the injection timing varies between the first temperature increase process Rc1 and the second temperature increase process Rc2, or the fuel injection amount is greater in the second temperature increase process Rc2 than in the first temperature increase process Rc1 and the injection timing varies between the first temperature increase process Rc1 and the second temperature increase process Rc2. That is, the first temperature increase process Rc1 and the second temperature increase process Rc2 have different injection conditions in terms of at least one of the fuel injection amount or the injection timing. In some embodiments, the first temperature increase process Rc1 may be executed by controlling the opening degree of the throttle valve 42, which serves as the temperature increase unit 4. Furthermore, the first temperature increase process Rc1 may be executed by controlling a common rail pressure of a common rail pressure control unit (not shown) for controlling the common rail pressure at which the fuel is injected, which serves as the temperature increase unit 4. Two or more of the fuel injection device 41, the throttle valve 42, and the common rail pressure control unit (not shown) may be used as temperature increase units upon execution.

Further, the DOC temperature increase execution part 22 may execute the blockage recovery process Rc also when a non-illustrated functional part of the regeneration control device 2 determines the blockage state D2 in which the DOC 31 is so blocked that a recovery process (blockage recovery process) is necessary. The blockage state D2 of the DOC 31 can be detected on the basis of comparison between a blockage parameter P related to blockage of the DOC 31 and a blockage threshold set in advance. For instance, the blockage parameter P may be the outlet temperature of the DPF 32, the outlet temperature of the DOC 31 (detection value of the DPF inlet temperature sensor 52), or a differential pressure between the inlet and the outlet of the DOC 31.

Furthermore, the DPF forced regeneration condition determination part 23 determines whether the forced regeneration execution condition Pf of the DPF 32 is satisfied. In the embodiment shown in FIGS. 1 to 5, the forced regeneration execution condition Pf is when the estimate value of the PM accumulation amount at the DPF 32 is greater than a predetermined value (threshold). Specifically, the differential pressure between the upstream side and the downstream side of the DPF 32 is detected by the DPF differential pressure sensor 63, and the PM accumulation amount may be estimated by using a map that sets a relationship between the differential pressure across the DPF 32 and the PM accumulation amount. Alternatively, the PM accumulation amount may be also estimated by detecting the engine rotation speed, the fuel injection amount, the air flow rate, and the DPF temperature (e.g. detection value of the DPF outlet temperature sensor 53), estimating the PM regeneration amount inside the DPF 32 by natural regeneration and the PM discharge amount from the engine 1 on the basis of the map stored in advance in the regeneration control device 2, and subtracting the PM regeneration amount from the PM discharge amount. In some embodiments, the forced regeneration execution condition Pf may be determined as satisfied in another way, such as when the operation time of the engine is longer than a predetermined time (threshold), or when the accumulated value of the fuel injection amount of the engine 1 is greater than a predetermined amount (threshold). Further, in the embodiment shown in FIGS. 1 to 5, if it is determined that the forced regeneration execution condition Pf is satisfied, the forced regeneration execution flag F is turned on. When the forced regeneration is completed, the forced regeneration execution flag F is turned off. The forced regeneration execution flag F is stored in a memory part (not shown), such as an ROM, a non-volatile memory such as a flash memory, a volatile memory such as a RAM of the regeneration control device 2, or an exterior storage device connected to the regeneration control device 2. For instance, the DPF forced regeneration condition determination part 23 may turn on the forced regeneration execution flag F, and the DPF forced regeneration execution part 24 or the like may turn off the forced regeneration execution flag F after completion of the forced regeneration process Rf.

If the forced regeneration execution condition Pf is satisfied, the DPF forced regeneration execution part 24 increases the temperature of the DPF 32 to the second temperature T2, and executes the forced regeneration process Rf for increasing the temperature of the DOC 31 to the first temperature T1. In the embodiment shown in FIGS. 1 to 5, if the forced regeneration execution condition Pf is satisfied, the DPF forced regeneration execution part 24 executes the blockage recovery process Rc, and increases the temperature of the DPF 32 to the second temperature T2 after completion of the blockage recovery process Re. That is, if the forced regeneration execution condition Pf for the DPF 32 is satisfied and the forced regeneration process Rf is to be executed, the blockage recovery process Rc for the DOC 31 is executed to recover the DOC 31, and then the forced regeneration process Rf is executed. As shown in FIG. 2, the DPF forced regeneration execution part 24 is connected to the DPF forced regeneration condition determination part 23, and the determination result obtained by the DPF forced regeneration condition determination part 23 is input to the DPF forced regeneration execution part 24. Further, in the embodiment shown in FIG. 2, the DPF forced regeneration execution part 24 and the DOC temperature increase execution part 22 are connected. When the forced regeneration process Rf is started, firstly, the DOC temperature increase execution part 22 is instructed to execute the blockage recovery process Rc, and after obtaining a notice of completion of the blockage recovery process Rc from the DOC temperature increase execution part 22, the forced regeneration process Rf is executed. However, the above embodiment is not limitative. In some embodiments, the forced regeneration process Rf may be executed solely and independently from the blockage recovery process Re when the blockage risk state D1 of the DOC 31 is not detected and the forced regeneration execution condition Pf is satisfied. In this case, for instance, the DPF forced regeneration execution part 24 may execute the forced regeneration process Rf after the temperature of the DPF 32 is increased to a temperature such as 250° C., at which the DOC 31 activates (activation temperature T0), if the forced regeneration execution condition Pf is satisfied.

Further, in the embodiment shown in FIGS. 1 to 5, the forced regeneration process Rf is executed by using the temperature increase unit 4 including the fuel injection device 41 which injects fuel to the combustion chamber 12 of the diesel engine 1. Specifically, as shown in FIG. 3, the forced regeneration process Rf is executed by early post injection by the fuel injection device 41, and late post injection by the fuel injection device 41. In detail, as shown in FIG. 3, the late-post injection is the second post injection injecting the fuel at a timing (in the vicinity of the bottom dead center) that does not contribute to combustion inside the combustion chamber 12 after the above described early-post injection. In the example shown in FIG. 3, while the piston disposed on the engine body 11 moves from the top dead center (TDC) to the bottom dead center (BDC), the main fuel injection is performed after passing the top dead center, and then the early post injection is performed. Then, after early post injection and before the piston reaches the bottom dead center (BDC) from the top dead center (TDC), the late post injection is performed. The late-post injection causes the non-combusted fuel to flow out from the combustion chamber 12 into the exhaust passage 16, and the discharged non-combusted fuel is oxidized by the DOC 31 to increase the temperature of the DPF 32 to the second temperature T2. Further, by increasing the temperature of the DPF 32 to the second temperature T2, it is possible to combust the PM accumulated on the DPF 32. Further, in the embodiment shown in FIGS. 1 to 5, the DPF forced regeneration execution part 24 ends the late post injection when a predetermined time passes and the PM accumulation amount becomes not greater than a threshold, and completes the forced regeneration process Rf.

Further, in some embodiments, the forced regeneration process Rf may be executed instead of the late post injection, or along with the late post injection, through exhaust pipe injection by an exhaust pipe injection device 44 disposed in the exhaust passage 16 on the upstream side of the DOC 31. In the example shown in FIG. 1, the exhaust pipe injection device 44 is disposed between a downstream position of the branch position of the EGR pipe 81 and the exhaust turbine 71 of the exhaust turbocharger 7. In some embodiments, the exhaust pipe injection device 44 may be disposed between the exhaust turbine 71 and the DOC 31. Further, the fuel injection amount to be injected from the exhaust pipe injection device 44 to the exhaust passage 16 is controlled by the regeneration control device 2.

The counter reset process part 25 resets the counter value C after completion of the forced regeneration process Rf by the DPF forced regeneration execution part 24. That is, all the counter values that the counter value C includes, related to the operation time of the diesel engine 1, such as the first counter value C1 described above for monitoring the blockage risk state D1 of the DOC 31, and the second counter value C2 and the third counter value C3 described below. Herein, resetting is not limited to setting an initial value (e.g. zero) for the counter, but includes reducing the counter value to a value that reflects the extent of adherence of substances to the DOC 31 at the time of completion of the forced regeneration process Rf. In the embodiment shown in FIGS. 1 to 5, as shown in FIG. 2, the counter reset process part 25 is connected to each of the DOC temperature increase execution part 22 and the DPF forced regeneration execution part 24. Further, a completion notice is input from the DOC temperature increase execution part 22 if the blockage recovery process Rc is performed independently, and a completion notice is input from the DPF forced regeneration execution part 24 if the forced regeneration process Rf is executed solely or if the blockage recovery process Rc and the forced regeneration process Rf are executed. When a completion notice is input, the counter reset process part 25 resets all of the first counter value C1, the second counter value C2, and the third counter value C3 that the counter value C includes. It will be naturally understood that only the counter value that is actually count up for determination of the blockage risk state D1 may be reset, included in the counter value C.

With reference to FIGS. 4 and 5, a control flow of the regeneration control device 2 having the above configuration at the time of operation of the diesel engine 1 will be described.

In step S41 of FIG. 4, the regeneration control device 2 monitors periodically, for instance, whether the execution condition of the regeneration recovery process R is satisfied. The execution condition of the regeneration recovery process R includes a condition whether the DOC 31 is in the temperature increase necessary state D including the blockage risk state D1, and a condition whether the forced regeneration execution condition Pf is satisfied (whether forced regeneration execution flag F is on). Further, if one of the execution conditions of the regeneration recovery process R is satisfied, the process advances to the next step S42, and the first temperature increase process Rc1 of the DOC 31 is executed. Further, the forced regeneration execution condition Pf may be determined as satisfied, if the automatic regeneration execution condition of the DPF 32 is satisfied, or if the manual regeneration execution condition is satisfied, or if at least one of the automatic regeneration execution condition or the manual regeneration execution condition is satisfied. Further, if the automatic regeneration execution condition of the DPF 32 is satisfied, the regeneration control device 2 turns on the forced regeneration execution flag F. In contrast, if the execution condition is not satisfied in step S41, the control logic of the regeneration recovery process R in FIG. 4 is ended. The above temperature increase necessary state D may include the blockage state D2. In the time chart shown in FIG. 5, the first temperature increase process Rc1 is started from time t1 in response to an execution condition being satisfied.

Thus, the temperature increase speed of the DOC 31 changes toward the increasing direction at time t1, and the temperature of the DOC 31 starts to be increased by the first temperature increase process Rc1.

In step S43 of FIG. 4, the regeneration control device 2 monitors whether the DOC 31 reaches the activation temperature T0 by the first temperature increase process Rc1.

Further, as the temperature of the DOC 31 reaches the activation temperature T0, the regeneration control device 2 completes the first temperature increase process Rc1, and then executes the second temperature increase process Rc2 in step S44. In the time chart shown in FIG. 5, the temperature of the DOC 31 is at the activation temperature T0 at time t2, and thus the first temperature increase process Rc1 is completed at time t2. Further, at time t2, the second temperature increase process Rc2 is started. Thus, the temperature increase speed of the DOC 31 changes toward the increasing direction at time t2. Further, the temperature of the DOC 31 is further increased at time t2 from the activation temperature T0, and reaches the first temperature T1 at time t3.

In step S45h of FIG. 4, the regeneration control device 2 monitors whether the interruption condition of the second temperature increase process Rc2 is satisfied, and in step S45 in FIG. 4, the regeneration control device 2 monitors whether the completion condition of the second temperature increase process Rc2 is satisfied, after the second temperature increase process Rc2 is started. The completion condition of the second temperature increase process Rc2 is set in order to have the DOC 31 at a temperature at which sediment of the DOC 31 combusts (the first temperature T1) for a predetermined time. In some embodiments, the blockage recovery process Rc may be configured to be completed after elapse of a predetermined time after start of the second temperature increase process Rc2, or after elapse of a predetermined time after the second temperature increase process Rc2 is started and reaching the first temperature T1, or after the temperature is at the first temperature T1 or higher continuously for a predetermined time. The predetermined time may be 20 minutes or longer after arriving at the first temperature T1, for instance. Further, the time may be set in accordance with the amount of sediment of the DOC 31 to be removed by the blockage recovery process Rc (e.g. map). Accordingly, it is possible to have the DOC 31 at the first temperature T1 at which substances adhering to the DOC 31 can be combusted, and to regenerate the DOC 31 from the temperature increase necessary state D including the blockage risk state D1. Further, in some embodiments, the second temperature increase process Rc2 may be configured to be completed after elapse of a predetermined time after arriving at a temperature that is lower than the first temperature T1 by a predetermined temperature (e.g. 10° C. or lower). Nevertheless, the predetermined time may be zero, in case of which the completion condition of the second temperature Rc2 is satisfied when reaching the first temperature T1, for instance.

Further, the above interruption condition is for interrupting (forcedly completing) the blockage recovery process Rc even if the above completion conditions are not satisfied. For instance, the interruption condition may be set so as to interrupt the blockage recovery process Rc if the completion condition is not satisfied after passing a predetermined time-out period, after start of one of the blockage recovery process Rc, the first temperature increase process Rc1 or the second temperature increase process Rc2. Alternatively, the time-out period may be set as a period not shorter than the period after which the DOC 31 is expected to reach the first temperature T1 after start of the second temperature increase process Rc2, and the interruption condition may be set so as to interrupt the blockage recovery process Rc if the DOC 31 does not reach the first temperature T1 after elapse of the time-out period after start of the second temperature increase process Rc2. Further, in FIG. 4, the control logic of the regeneration recovery process R is ended if the interruption condition is satisfied. After that, the above described retry control may be executed from step S42, or a notification may be issued to prompt manual execution of the blockage recovery process Rc. Alternatively, the control logic of the regeneration recovery process R may be continued by jumping from step S45h to step S46 or step S47 described below. Further, in the embodiment shown in FIG. 2, as shown in the drawing, the DOC temperature increase execution part 22 is connected to a temperature-increase temperature monitoring part 26 (described below), thus being capable of obtaining the temperature of the DOC 31.

Further, in step S45, if the completion condition of the second temperature increase process Rc2 is satisfied, the regeneration control device 2 completes the second temperature increase process Rc2 in step S46, and the blockage recovery process Rc is completed. In the time chart shown in FIG. 5, the completion condition of the second temperature increase process Rc2 is satisfied at time t4.

In the subsequent step S47 of FIG. 4, the regeneration control device 2 determines whether the execution condition of the forced regeneration process Rf is satisfied. If the execution condition of the forced regeneration process Rf is satisfied, step S48 and the following steps are executed. The execution condition of the forced regeneration process Rf is determined to be satisfied, if it is determined that the forced regeneration execution flag F is on in step S41, or if it is determined that the forced regeneration execution flag F is on upon determination of step S47, such as when the forced regeneration execution flag F is off in step S41 but becomes on during execution of the blockage recovery process Rc (step S42 to step S46). In contrast, if the execution condition of the forced regeneration process is not satisfied in step S47, the process advances to step S410 without executing the forced regeneration process Rf. In the embodiments shown in FIGS. 1 to 5, the execution condition of the forced regeneration process Rf is when the first counter value C1 is greater than the first threshold V1 by the first blockage risk state determination part 21a, if the execution condition is determined as satisfied in step S41 for the forced regeneration execution condition Pf is determined as satisfied.

Further, the forced regeneration process Rf is executed in step S48, and if the completion condition of the forced regeneration process Rf is satisfied, such as elapse of a predetermined time, in the subsequent step S49, the forced regeneration process Rf is completed. Further, if the forced regeneration process Rf is completed in step S48, the forced regeneration execution flag F is turned off (not shown). In the time chart shown in FIG. 5, the forced regeneration process Rf is executed from time t4 when the temperatures of the DOC 31 and the DPF 32 are increased to around the first temperature T1, and the temperature of the DPF 32 is increased to the second temperature T2 at time t5 by the forced regeneration process Rf. Further, the regeneration control device 2 controls the temperature increase unit 4 so as to maintain the second temperature T2. On the other hand, for the DOC 31, the regeneration control device 2 controls the temperature increase unit 4 so as to maintain the first temperature T1 from time t4 when the blockage recovery process Rc is completed. Accordingly, similarly to execution of the blockage recovery process Rc, recovery of the DOC 31 is performed also during execution of the forced regeneration process Rf, and thus the recovery of the DOC 31 in the temperature increase necessary state D is performed by the blockage recovery process Rc and the forced regeneration process Rf. Further, at time t6, the forced regeneration process Rf is completed, and after time t6, the temperature of the DOC 31 and the temperature of the DPF 32 each decrease gradually with time. Further, in the embodiments shown in FIGS. 1 to 5, as shown in FIG. 5, the temperature of the DOC 31 is controlled to maintain the first temperature T1. Nevertheless, in some other embodiments, the temperature of the DOC 31 may be controlled to be maintained at the activation temperature T0 or higher.

In some embodiments, between step S48 and step S49, a step (not shown) may be provided to determine whether an in interruption condition for interrupting (forcedly completing) the forced regeneration process Rf is satisfied, and if the interruption condition is satisfied, interrupt the forced regeneration process Rf. If the interruption condition is satisfied, even if the completion of the forced regeneration process Rf is not satisfied in step S49, the flow of FIG. 4 is ended after execution of step S410 or without executing step S410. The interruption condition of the forced regeneration process Rf may be whether a DPF abnormally high temperature error is detected, provided that a DPF abnormally high temperature error is when the exhaust gas temperature at the outlet of the DPF 32 (e.g.

detection value of the DPF outlet temperature sensor 53) exceeds a predetermined temperature threshold (e.g. 750° C. or higher) that is higher than the second temperature T2 during execution of the forced regeneration process Rf of the DPF 32. In this case, it is determined that the interruption condition is satisfied if the DPF abnormally high temperature error is detected. As the DOC becomes blocked, a part of late-post injected fuel (e.g. light oil fuel) passes through the DOC 31 and reaches the DPF 32 downstream thereof, and is oxidized and heated by a catalyst that the DPF 32 supports, causing the temperature of the outlet of the DPF 32 to become abnormally high. Thus, if the DPF abnormally high temperature error is detected before the completion condition of the forced regeneration process Rf is satisfied, there is a possibility that the DOC 31 is blocked. Thus, while interrupting the forced regeneration process Rf and preventing burn damage to the DPF 32 or the like, the DOC 31 may be determined to be in the temperature increase necessary state D, and the blockage recovery process Re may be executed again from step S42. For the blockage recovery process Rc after the DPF abnormally high temperature error is detected, the temperature-increase execution period Pcp (described below) may be set longer than that in a case where the abnormally high temperature error is not detected. By ensuring a longer execution period for the blockage recovery process Rc (specifically, the time between time t3 and time t4 in FIG. 5), it is possible to recover the DOC 31 from blockage reliably.

Further, in the final step S410, the regeneration control device 2 resets all the counter values C including the first counter value C1. The step S410 is executed regardless of the presence or absence of execution of the forced regeneration process Rf in step S48. This is because, the blockage recovery process Rc has been already executed in steps S42 to S46 regardless of the determination in step S47 of whether the execution condition of the forced regeneration process Rf is satisfied in step S47, and the DOC 31 is recovered through the blockage recovery process Rc. Then, after step S410, the control logic of the regeneration recovery process R is ended.

Figure 6A:
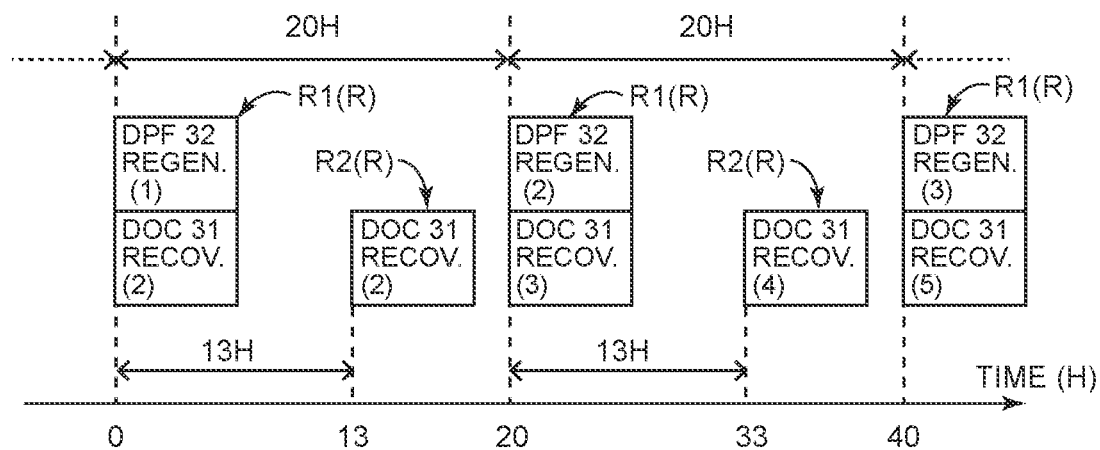
FIG. 6A is a diagram showing a time chart of a regeneration recovery process executed by the control logic of a regeneration recovery process shown in FIG. 4.
Figure 6B:
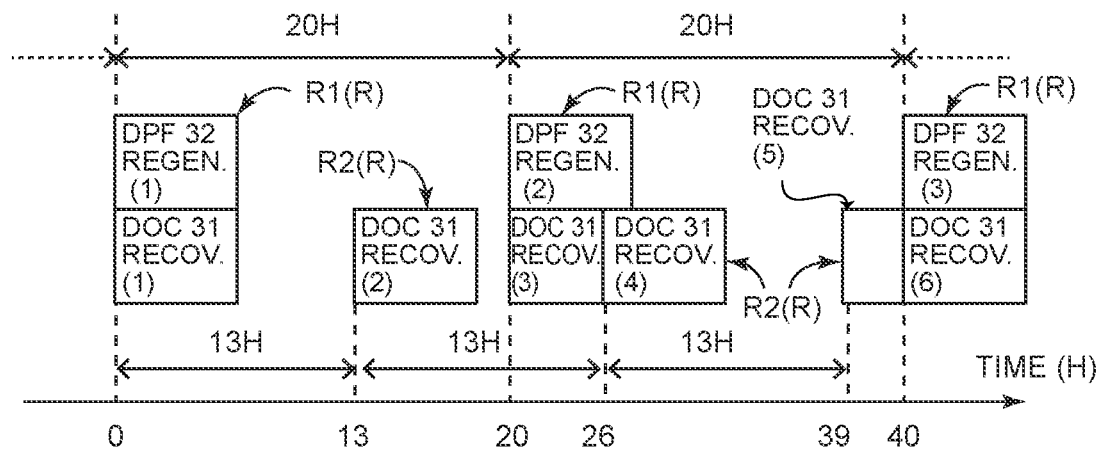
FIG. 6B is a comparative example of a case in which a counter value is not reset after completion of a forced regeneration process, for comparison to FIG. 6A.

Further, with reference to FIGS. 6A and 6B, the execution frequency of the regeneration recovery process R executed by the control logic of the regeneration recovery process R shown in FIG. 4 will be described. FIG. 6A is a diagram showing a time chart of the regeneration recovery process R executed by the control logic of the regeneration recovery process R shown in FIG. 4. FIG. 6B is a comparative example of a case in which a counter value C is not reset after completion of the forced regeneration process Rf, for comparison to FIG. 6A. To simplify the description, in FIGS. 6A and 6B, the DPF 32 satisfies the forced regeneration execution condition Pf at time intervals of 10 to 20 hours (in FIGS. 6A and 6B, 20 hours), for instance, and each time the regeneration control device 2 executes the regeneration recovery process R (first-type regeneration recovery process R1) including the blockage recovery process Rc and the forced regeneration process Rf. Further, the first blockage risk state determination part 21a determines whether the DOC 31 is in the blockage risk state D1 (temperature increase necessary state D), at time intervals of 10 hours or longer (in FIGS. 6A and 6B, every 13 hours), and each time the regeneration control device 2 executes the regeneration recovery process R (second-type regeneration recovery process R2) including the blockage recovery process Rc. Similarly, to simplify the description, the execution period of the regeneration recovery process R is not taken into account, and is regarded as included in the above time intervals.

In FIGS. 6A and 6B, provided that the reference time (time zero) is the start of the execution of the first-type regeneration recovery process R (R1) shown in the drawings, the first-type regeneration recovery process R1 including the blockage recovery process Rc and the forced regeneration process Rf is performed every 20 hours, three times in total, as the forced regeneration execution condition Pf is satisfied. Further, in FIG. 6A, each time the first-type regeneration recovery process R1 is completed, the counter value C is reset. Thus, the second-type regeneration recovery process R2 that is executed every 13 hours in response to determination of the blockage risk state D1 by the first blockage risk state determination part 21a is executed 13 hours after each of the three executions of the first-type regeneration recovery process R1. Thus, in FIG. 6A, the blockage recovery process Rc is performed five times in total, in the first-type regeneration recovery process R1 and the second-type regeneration recovery process R2.

In contrast, FIG. 6B is a diagram (comparison example) showing a case in which the counter value C is not reset after completion of the forced regeneration process Rf, and the counter value C is not reset after completion of the first-type regeneration recovery process R1 but reset only after completion of the second-type regeneration recovery process R2. That is, the second-type regeneration recovery process R2 is executed every 13 hours regardless of the first-type regeneration recovery process R1. Thus, in FIG. 6B, the total number of times the blockage recovery process Rc is performed by the first-type regeneration recovery process R1 and the second-type regeneration recovery process R2 is six, one time more than five in the case of FIG. 6A. Further, in FIG. 6B, there is a time interval of one hour between the second-type regeneration recovery process R2 executed after 39 hours and the third first-type regeneration recovery process R1 executed after 40 hours, which is a short time compared to the interval before the DOC 31 reaches the blockage risk state D1, which is 13 hours. Thus, only a small amount of substances adhere to the DOC 31 40 hours after completion of the second-type regeneration recovery process R2 that is executed after 39 hours. Nevertheless, the blockage recovery process Rc is executed by the first-type regeneration recovery process R1 after 40 hours. That is, in the example shown in FIG. 6A, the regeneration control device 2 resets the counter value C as described above to adjust the execution timing of the blockage recovery process Rc, and executes the second-type regeneration recovery process R2 in the execution interval of the first-type regeneration recovery process R1, and thereby an appropriate execution frequency of the second-type regeneration recovery process R2 is achieved.

With the above configuration, whether the DOC 31 is in the blockage risk state D1 and whether the forced regeneration execution condition Pf of the DPF 32 is satisfied are performed separately. Further, the regeneration control device 2 executes the blockage recovery process Rc if it is determined that the DOC 31 is in the blockage risk state D1, and executes the blockage recovery process Rc and the forced regeneration process Rf if it is determined that the forced regeneration execution condition Pf is satisfied. As described above, if it is determined that the forced regeneration execution condition Pf is satisfied, both of the forced regeneration process Rf of the DPF 32 and the blockage recovery process Rc of the DOC 31 are executed, and thus it is possible to efficiently execute recovery of the DOC 31 and regeneration of the DPF 32. Furthermore, in addition to preventing blockage of the DOC 31 in advance, it is possible to prevent deterioration of fuel efficiency, burn damage to the DPF 32, oil dilution, by recovering the DOC 31 first before executing the forced regeneration of the DPF 32 to prevent slip of non-combusted fuel due to blockage of the DOC 31. Further, after completion of the forced regeneration process Rf of the DPF 32, the counter value C for determining whether the DOC 31 is in the blockage risk state D1 is reset. Accordingly, by starting determination of whether the DOC 31 is in the blockage risk state D1 using the reset counter value C after completion of forced regeneration of the DPF 32, it is possible to perform the blockage recovery process Rc at an appropriate frequency while maintaining the determination accuracy of the blockage risk state D1.

Further, in some embodiments, as shown in FIG. 7, the DPF forced regeneration execution part 24 executes the forced regeneration process Rf after completion of the blockage recovery process Rc by the DOC temperature increase execution part 22, if the first blockage risk state determination part 21a determines that the DOC 31 is in the blockage risk state D1. Further, if the first blockage risk state determination part 21a determines that the DOC 31 is in the blockage risk state D1, even if the forced regeneration execution condition Pf is not satisfied, the forced regeneration process Rf is executed too after completion of the blockage recovery process Rc. If the blockage risk state D1 of the DOC 31 is determined on the basis of the first counter value C1 and the blockage recovery process Re is executed in response to determination based on the first counter value C1, the forced regeneration process Rf of the DPF 32 is also executed. Thus, it is possible to recover the DOC 31 and regenerate the DPF 32 efficiently. Further, it is possible to execute the forced regeneration process Rf from a state where the temperature is increased to the first temperature T1 through the blockage recovery process Rc, and thus it is possible to improve the fuel efficiency.

FIG. 7 is a diagram showing a control logic of the regeneration recovery process R of the regeneration control device 2 according to an embodiment of the present invention, where the blockage recovery process Rc is performed on the basis of determination by the first blockage risk state determination part 21a. The control logic of FIG. 7 is executed periodically, for instance. In step S71 of FIG. 7, the regeneration control device 2 determines whether the forced regeneration execution flag F is on, during normal operation, for instance. More specifically, it is determined whether the forced regeneration execution condition Pf of the DPF 32 is satisfied, which includes at least one of the automatic regeneration execution condition or the manual regeneration execution condition. Further, if it is determined that the forced regeneration execution condition Pf is not satisfied, in step S77, during operation of the engine 1, the regeneration control device 2 determines whether the DOC 31 is in the blockage risk state D1, with the first blockage risk state determination part 21a. Further, in step S77, if it is determined that the DOC 31 is not in the blockage risk state D1, the control logic of FIG. 7 is ended. In contrast, the regeneration control device 2 executes the regeneration recovery process R if it is determined that the forced regeneration execution condition Pf is satisfied in step S71, or if it is determined that the DOC 31 is in the blockage risk state D1 in step S76. Specifically, the blockage recovery process Rc is executed in step S72, and then the forced regeneration process Rf is executed in step S73. Further, if the forced regeneration process Rf is completed in step S74, the forced regeneration execution flag F is turned off in step S75 and the process advances to step S76. In step S76, all of the counter values C including the first counter value C1 are reset. Further, steps S72 to S76 in FIG. 7 correspond to steps S42 to S410 in FIG. 4 described above. The execution condition of the forced regeneration process Rf in step S47 in FIG. 4 corresponds to a case where the steps S42 to S410 in FIG. 4 are executed in a case where at least one of the following conditions is satisfied: if the forced regeneration execution condition of the DPF 32 is satisfied; or if the DOC 31 is in the blockage risk state D1.

With the above configuration, if the first blockage risk state determination part 21a determines that the DOC 31 is in the blockage risk state D1, the regeneration control device 2 executes the forced regeneration process Rf after completion of the blockage recovery process Rc. Accordingly, it is possible to execute the forced regeneration process Rf from a state where the temperature is increased to the first temperature T1 through the blockage recovery process Rc, and thus it is possible to improve the fuel efficiency.

Further, in some embodiments, the DOC blockage risk state determination part 21 further includes a determination threshold correction part 21u configured to correct at least one of the exhaust temperature threshold or the first threshold V1 on the basis of at least one of the atmospheric pressure, the atmospheric temperature, or the water temperature of the diesel engine. That is, the exhaust temperature threshold or the first threshold used in determination by the first blockage risk state determination part 21a is corrected in accordance with the environment around the engine 1. For instance, in an environment where the atmospheric pressure is low and the oxygen concentration in the atmosphere is low, such as highlands, blockage of the DOC 31 is more likely to occur compared to another unlike environment. Thus, the exhaust temperature threshold or the first threshold V1 set in an assumed environment are corrected if the assumed environment changes to an environment where blockage of the DOC 31 is likely to occur, and thereby blockage of the DOC 31 is prevented in advance.

More specifically, the determination threshold correction part 21u of the regeneration control device 2 determines whether the engine 1 is in an environment where blockage of the DOC 31 is more likely to occur, on the basis of the atmospheric pressure, the atmospheric temperature around the engine 1, or the water temperature of the engine 1. Further, if it is determined that the engine 1 in an environment with a higher risk of blockage of the DOC 31, the determination threshold correction part 21u corrects the exhaust temperature threshold to a greater value, and thereby reduces the first threshold V1. Accordingly, the blockage recovery process Rc executed in response to determination by the first blockage risk state determination part 21a after correction is executed at an earlier timing than that before correction. For instance, the determination threshold correction part 21u may calculate a correction factor for correcting at least one of the exhaust temperature threshold or the first threshold V1, and calculate the at least one of the exhaust temperature threshold or the first threshold V1 and the correction factor to determine the corrected exhaust temperature threshold and the corrected first threshold V1. The correction factor may be obtained by using a map or a function that specifies a corresponding relationship between the correction factor and at least one of the atmospheric pressure, the atmospheric temperature, or the water temperature of the engine 1. With this map, it is possible to easily obtain a correction factor from at least one of the atmospheric pressure, the atmospheric temperature, or the water temperature of the engine 1, and correct at least one of the first threshold V1 or the exhaust temperature threshold automatically or manually. Similarly, the determination threshold correction part 21u may correct at least one of the second threshold V2 or the third threshold V3, in addition to correction of the first threshold V1, or independently from correction of the first threshold V1. Correction of the second threshold V2 and the third threshold V3 can be described by replacing the first threshold V1 in the above description of the determination threshold correction part 21u, and thus not described in detail.

In the embodiment described next, as shown in FIG. 1, the regeneration control device 2 further includes a temperature-increase temperature monitoring part 26 which monitors the temperature T of the DOC 31 during execution of the blockage recovery process Re, and the blockage recovery process Rc is controlled on the basis of the temperature T of the actual DOC 31. In the embodiments shown in FIGS. 1 to 5, the temperature-increase temperature monitoring part 26 is connected to the DOC inlet temperature sensor 51, and the detection value obtained by the DOC inlet temperature sensor 51 is input thereto. Accordingly, the temperature-increase temperature monitoring part 26 can obtain and monitor the temperature of the DOC 31.

In some embodiments, the counter value C includes the second counter value C2, which is the accumulated operation time of the diesel engine I. The DOC blockage risk state determination part 21 further includes the second blockage risk state determination part 21b which determines that the DOC 31 is in the blockage risk state D1 if the second counter value C2 is greater than a predetermined second threshold V2. Further, the regeneration control device further includes a mode start part 27 which starts a temperature increase failure recovery mode configured to determine, as a temperature increase failure, a case in which the temperature T of the DOC 31 is higher than a first temperature threshold which is lower than the first temperature T1 for no longer than a predetermined time, during execution of the blockage recovery process Re in response to determination by the first blockage risk state determination part 21a, and start a temperature increase failure recovery mode for starting determination of the blockage risk state D1 by the second blockage risk state determination part 21b if the blockage recovery process Rc is executed under the temperature increase failure successively a first number of times. The predetermined time in the present embodiment is set as a period of time required to recover the DOC 31 from the blockage risk state D1 while being heated at the first temperature T1.

That is, in the present embodiment, at each blockage recovery process Rc executed once or more in accordance with the operation time of the engine 1, the temperature T of the DOC 31 is monitored, and it is determined whether the DOC 31 is recovered appropriately on the basis of the temperature T of the DOC 31 in each blockage recovery process Rc, and also the temperature increase failure recovery mode is started in accordance with the determination result. The temperature increase failure recovery mode is a mode for executing the blockage recovery process Rc at an earlier timing than that in the blockage recovery process Rc that is executed in response to determination by the first blockage risk state determination part 21a. That is, the regeneration control device 2 ensures reliable recovery of the DOC 31 that cannot be recovered sufficiently by the blockage recovery process Rc under a temperature increase failure, by starting the temperature increase failure recovery mode and increasing the frequency of the blockage recovery process Rc. In some embodiments, the mode start part 27 stops determination of the blockage risk state D1 by the first blockage risk state determination part 21a, and starts determination by the second blockage risk state determination part 21b. In some other embodiments, determination by the first blockage risk state determination part 21a and determination by the second blockage risk state determination part 21b may be executed at the same time.

Further, in some embodiments, the first temperature threshold is 360° C., for instance, and the first number of times is twice, for instance, and the predetermined time is 15 minutes. Nevertheless, this embodiment is not limitative. It is sufficient if the first temperature threshold is lower than the first temperature T1, and the first number of times is once or more. For instance, by setting the first number of times to a number that can detect a temperature increase failure due to a temporary factor, such as twice, it is possible to prevent the temperature increase failure recovery mode from being started too often due to occurrence of temperature increase failure due to a temporary factor, and to prevent deterioration of the fuel efficiency.

With the above configuration, it is determined whether the temperature of the DOC 31 is increased appropriately in the blockage recovery process Rc. If the temperature of the DOC 31 is not increased appropriately, substances adhering to the upstream end surface of the DOC 31 such as SOF or soot of non-combusted fuel are not combusted sufficiently by the blockage recovery process Rc, and the DOC 31 is not recovered appropriately. Thus, if the blockage recovery process Re of the temperature increase failure is executed successively the first number of times, it is possible to prevent blockage of the DOC 31 in advance by starting determination of the blockage risk state D1 by the second blockage risk state determination part 21b.

Further, in some embodiments, the second threshold V2 is set such that the average time interval between two successive blockage recovery processes Rc executed in response to determination by the second blockage risk state determination part 21b is shorter than the average time interval between two successive blockage recovery processes Re executed in response to determination by the first blockage risk state determination part 21a. The second threshold V2 used by the second blockage risk state determination part 21b is three hours, for instance, and is set to be shorter than the first threshold V1 that is 10 hours or longer, for instance. In this way, the second blockage risk state determination part 21b determines the blockage risk state D1 before the first blockage risk state determination part 21a determines the blockage risk state D1. In other words, in two blockage recovery processes Re executed in response to determination by the first blockage risk state determination part 21a, after completion of the first blockage recovery process Re and before the second blockage recovery process Rc is executed, the blockage recovery process Rc is executed in response to determination by the second blockage risk state determination part 21b. Thus, in the blockage recovery process Re executed in response to determination by the first blockage risk state determination part 21a, even if there is a blockage recovery process Rc under a temperature increase failure where the temperature of the DOC 31 is not appropriately increased due to some factor and the DOC 31 is not recovered appropriately, the blockage recovery process Rc is executed in response to determination by the second blockage risk state determination part 21b, and thus it is possible to execute the blockage recovery process Rc at an appropriate frequently and recover the DOC 31 appropriately.

Further, in some embodiments, the mode start part 27 ends the temperature increase failure recovery mode if the temperature of the DOC 31 in the blockage recovery process Rc executed after start of the temperature increase failure recovery mode is greater than the first temperature threshold. That is, even if determination of the blockage risk state D1 by the second blockage risk state determination part 21b is started once, if the blockage risk state D1 without a temperature increase failure is executed, determination of the blockage risk state D1 by the second blockage risk state determination part 21b is terminated.

With the above configuration, after the temperature increase failure recovery mode is started, if recovery of the DOC 31 is performed appropriately by the blockage recovery process Rc again, the temperature increase failure recovery mode is terminated. Accordingly, the blockage risk state D1 of the DOC 31 is determined by another determination part (e.g. 21a, 21c) such as the first blockage risk state determination part 21a, and thereby it is possible to prevent blockage of the DOC 31 in advance. Furthermore, the frequency of the blockage recovery process Rc is changed back to the normal frequency, and thereby it is possible to prevent deterioration of the fuel efficiency.

Further, in some embodiments, as shown in FIG. 2, the regeneration control device 2 further includes a notification part 28 (first notification part 28a) configured to notify that the blockage recovery process Rc is performed under the temperature increase failure successively a second number of times, the second number being greater than the first number, or notify to prompt manual execution of the blockage recovery process Rc if the blockage recovery process is performed under the temperature increase failure successively the second number of times. That is, if the blockage recovery process Rc is performed under temperature increase failure successively the second number of times, an operator is notified to take same measure, for the blockage recovery process Rc under temperature increase failure is likely due to a factor other than a temporary factor. The notification part 28 (first notification part 28a, second notification part 28b) may be connected to a notification device (not shown) such as a screen, a speaker, a lighting device such as LEDs and lamps, and a vibration device, to issue notifications via the notification device. Further, an operator may be notified by visual notification such as display on the screen, lighting or flashing of the light device, auditory notification by sound or voice, vibration, or combination of the above. In some embodiments, the first number of time is twice and the second number of times is eight times. Nevertheless, this embodiment is not limitative, and the second number of times may be any number of times at which notification of an operator is determined as necessary. Further, the mode start part 27 may be configured to perform the above determination and instruct the notification part 28 to issue a notification. In response to such a notification, an operator may execute the blockage recovery process Rc manually to increase the temperature of the DOC to a temperature higher than that in the blockage recovery process Rc automatically executed by the regeneration control device 2.

With the above configuration, in a case where the blockage recovery process Rc is executed under temperature increase failure successively the second number of times, it is possible to notify an operator that it is necessary to change the blockage recovery process execution condition Pc.

Furthermore, in some embodiments, as shown in FIGS. 8 to 10, the counter value C includes the third counter value C3, which is an accumulated operation time of the diesel engine 1. Further, the DOC blockage risk state determination part 21 includes a third blockage risk state determination part 21c which determines that the DOC 31 is in the blockage risk state D1, if the third counter value C3 is greater than the third threshold V3. The counter reset process part 25 resets the counter value C including the third counter value C3, after completion of the blockage recovery process Rc started in accordance with determination of the third blockage risk state determination part 21c. The third blockage risk state determination part 21c is for addressing a situation in which the engine 1 is in an environment where blockage of the DOC 31 is likely to occur, and a situation in which the change in the environment of the engine 1 changes the composition of PM (e.g. soot, SOF) and the combustion state, which increases the blockage speed of the DOC 31. For instance, while the oxygen concentration in air decreases at a higher altitude, a low oxygen concentration deteriorates the combustion state of the engine 1, and causes the blockage speed of the DOC 31 to increase. If the blockage speed of the DOC 31 increases as described above, the blockage risk state D1 is determined on the basis of the accumulated operation time of the engine 1.

In some embodiments, the third threshold V3 is set to five to ten hours, that is shorter than the first threshold V1, which is ten hours, for instance. The third threshold V3 may be set to be shorter than the average time interval of determination of the blockage risk state D1 by the first blockage risk state determination part 21a, and longer than the second threshold V2 used in determination by the second blockage risk state determination part 21b. Accordingly, the execution frequency of the blockage recovery process Rc is increased, in order to prevent blockage of the DOC 31 in an environment with a high risk of blockage in advance. For instance, the third threshold V3 may be set automatically or manually on the basis of a map or a function that specifies a corresponding relationship between the third threshold V3 and at least one of the atmospheric pressure, the atmospheric temperature, or the water temperature of the engine 1 which can be used to estimate an environment with a high risk of blockage.

More specifically, an environment with a high risk of blockage of the DOC 31 may be estimated by determining a situation where the oxygen concentration in air is low, on the basis of comparison between a threshold and a detection value of an oxygen sensor capable of detecting the oxygen concentration and a detection value of an atmospheric pressure sensor capable of detecting the atmospheric pressure. Further, the third blockage risk state determination part 21c counts the accumulated operation time of the engine 1 in a case where it is determined that the environment is such that blockage of the DOC is likely to occur, such as a case where the oxygen concentration in the atmosphere is lower than that of an assumed environment. Further, each of the plurality of function parts (at least two of the first blockage risk state determination part 21a, the second blockage risk state determination part 21b, or the third blockage risk state determination part 21c) monitors the blockage risk state D1, and thereby it is possible to prevent blockage of the DOC 31 in advance.

FIG. 8 is a diagram showing a control logic of the regeneration recovery process R of the regeneration control device 2 according to an embodiment of the present invention, where the blockage recovery process Rc is performed on the basis of determination by the third blockage risk state determination part 21c. The control logic of the regeneration recovery process R in FIG. 8 is executed periodically, for instance. In the embodiment shown in FIG. 8, steps S81 to S86 are the same as steps S71 to S76, respectively, and thus not described in detail.

In step S87 in FIG. 8, during operation of the engine 1, the regeneration control device 2 determines whether the DOC 31 is in the blockage risk state D1, with the third blockage risk state determination part 21c. Further, in step S87, if it is determined that the DOC 31 is not in the blockage risk state D1, the control logic of FIG. 8 is ended. In contrast, in step S87, if it is determined that the third counter value C3 is greater than the third threshold V3, it is determined that the DOC 31 is in the blockage risk state D1, and thus the blockage recovery process Rc is executed in step S88. Further, after it is determined that the blockage recovery process Rc is completed in step S89, the process advances to step S86. In step S86, all of the counter values C that the counter value C includes, including the third counter value C3, are reset.

As described above, the embodiment shown in FIG. 8 is different from the embodiment shown in FIG. 7 in that the counter value C is reset in step S96 both after completion of forced regeneration of the DPF 32 in response to the forced regeneration execution flag F being turned on, and after completion of the blockage recovery process Rc executed in response to determination by the third blockage risk state determination part 21c.

FIG. 9 is a diagram showing a control logic of a regeneration recovery process R of the regeneration control device 2 according to an embodiment of the present invention, where the blockage recovery process Rc is performed on the basis of determination by the first blockage risk state determination part 21a and determination by the third blockage risk state determination part 21c. The control logic of FIG. 9 is executed periodically, for instance. In the embodiment shown in FIG. 9, steps S91 to S97 are the same as steps S71 to S77, respectively, and thus not described in detail.

In step S97 in FIG. 9, during operation of the engine 1, the regeneration control device 2 advances to step S98, if the first blockage risk state determination part 21a determines that the DOC 31 is not in the blockage risk state D1. In step S98, the third blockage risk state determination part 21c of the regeneration control device 2 determines whether the DOC 31 is in the blockage risk state D1. Further, in step S98, if it is determined that the third counter value C3 is greater than the third threshold V3, the blockage recovery process Rc is executed in step S99. Further, after it is determined that the blockage recovery process Rc is completed in step S910, the process advances to step S96, and resets all the counter values C including the first counter value C1 and the third counter value C3. In contrast, in step S98, if it is not determined that the third counter value C3 is greater than the third threshold V3, the control logic of FIG. 9 is ended.

As described above, the embodiment shown in FIG. 9 is different from the embodiment shown in FIG. 7 in that the counter value C is reset in step S96 both after completion of forced regeneration of the DPF 32 in response to the forced regeneration execution flag F being turned on, and after completion of the blockage recovery process Rc executed in response to determination by the third blockage risk state determination part 21c. In FIG. 9, determination by the third blockage risk state determination part 21c is performed next to determination by the first blockage risk state determination part 21a. Accordingly, forced regeneration of the DPF 32 is executed when it is determined that the DOC 31 is in the blockage risk state D1 and the forced regeneration execution condition Pf is satisfied, at the same time, and thereby it is possible to perform the blockage recovery process Rc and the forced regeneration process Rf on the exhaust gas treatment device 3.

FIG. 10 is a diagram showing a control logic of a regeneration recovery process R of the regeneration control device 2 according to an embodiment of the present invention, where the blockage recovery process Rc is performed on the basis of determination by the second blockage risk state determination part 21b and the third blockage risk state determination part 21c. The control logic of FIG. 10 is executed periodically, for instance. Steps S101 to S106, and steps S109 to S1010 in FIG. 10 are the same as steps S91 to S96 and steps S99 to S910 in FIG. 9, and thus not described again. In steps S107 to S108, during operation of the engine 1, the regeneration control device 2 determines whether the DOC 31 is in the blockage risk state D1, with the second blockage risk state determination part 21b and the third blockage risk state determination part 21c. Specifically, the process advances to step S109 and the blockage recovery process Rc is executed if one of the following is satisfied: the second counter value C2 is greater than the second threshold V2; or the third counter value C3 is greater than the third threshold V3. In contrast, in both of step S107 and step S108, if it is not determined that the second counter value C2 is greater than the second threshold V2 and it is not determined that the third counter value C3 is greater than the third threshold V3, the control logic of FIG. 10 is ended.

With the above configuration, in a case where the diesel engine 1 is operated in an environment where blockage of the DOC 31 is likely to occur, such as highlands, the regeneration control device 2 can prevent blockage of the DOC in advance by executing the blockage recovery process Rc on the basis of the accumulated operation time.

Further, in some embodiments, as shown in FIG. 2, the regeneration control device 2 includes a blockage recovery process condition correction part 29 which corrects a temperature-increase temperature or a temperature-increase period for the second blockage recovery process Rc on the basis of the temperature of the DOC in the first blockage recovery process Rc, for two successive blockage recovery processes Rc. For instance, when the DOC temperature increase execution part 22 executes the blockage recovery process Rc in accordance with the blockage recovery process execution condition Pc, the temperature T of the DOC 31 may fail to reach the target temperature-increase temperature Pct (first temperature T1) due to some factor. In such a case, substances adhering to the DOC 31 may not become completely combusted in the blockage recovery process Rc due to temperature increase failure, and the DOC 31 cannot be recovered sufficiently. Thus, the blockage recovery process condition correction part 29 ensures reliable recovery of the DOC 31 by correcting the blockage recovery process execution condition Pc to combust, in the next blockage recovery process Rc to be executed, the adhering substances that remain non-combusted after the previous blockage recovery process Rc.

In the embodiment shown in FIG. 2, the blockage recovery process condition correction part 29 is connected to the temperature-increase temperature monitoring part 26, and obtains information of the temperature T of the DOC 31 from the temperature-increase temperature monitoring part 26. Further, on the basis of the temperature T of the DOC 31 in the previous blockage recovery process Rc that completes earlier, the blockage recovery process execution condition Pc of the later blockage recovery process Rc to be executed next is corrected (set). More specifically, the blockage recovery process execution condition Pc includes at least one of the target temperature-increase temperature Pct or the temperature-increase execution period Pcp, and the blockage recovery process condition correction part 29 corrects at least one of the above. For instance, if the average of the temperature T of the DOC 31 is lower than the target temperature-increase temperature Pct, the target temperature-increase temperature Pct may be corrected to be higher to increase the temperature of the DOC 31 to a higher temperature, bringing the actual temperature T of the DOC 31 in the blockage recovery process Rc to the target temperature-increase temperature Pct (first temperature T1). Alternatively, if it is possible to combust the adhering substances that remain non-combusted due to the temperature T being lower than the target temperature-increase temperature Pct by extending the temperature-increase execution period Pcp, the temperature-increase execution period Pcp may be corrected to become longer.

Further, in some embodiments, for correction of the blockage recovery process execution condition Pc, the correction factor may be obtained from at least one of the temperature T of the DOC 31 or the temperature-increase execution period Pcp, on the basis of a map or a function that specifies a relationship between the correction factor and at least one of the temperature T of the DOC 31 or the temperature-increase execution period Pcp. Further, at least one of the target temperature-increase temperature Pct or the temperature-increase execution period Pcp included in the blockage recovery process execution condition Pc of the previous blockage recovery process Rc may be corrected with the correction factor, and decided to be the blockage recovery process execution condition Pc of the later blockage recovery process Rc.

With the above configuration, it is possible to control the blockage recovery process Rc by correcting the target temperature-increase temperature Pct or the temperature-increase execution period Pcp included in the blockage recovery process execution condition Pc.

Embodiments of the present invention were described in detail above, but the present invention is not limited thereto, and various amendments and modifications may be implemented.

For instance, in some embodiments, the blockage recovery process execution condition Pc may be connected to the second blockage risk state determination part 21b or the third blockage risk state determination part 21c. Then, at least one of the second threshold V2 or the third threshold V3 for determining the blockage risk state D1 of the DOC 31 may be corrected on the basis of the temperature T of the DOC 31 and a corresponding relationship between the temperature T of the DOC 31 and the correction factor specified in a map or a function, to increase the execution frequency of the blockage recovery process Rc.

DESCRIPTION OF REFERENCE NUMERALS

1 Diesel engine (engine)
11 Engine body
12 Combustion chamber
13 Intake passage
14 Intake port
15 Intake manifold
16 Exhaust passage
17 Exhaust port
2 Regeneration control device
21 DOC blockage risk state determination part
21a First blockage risk state determination part
21b Second blockage risk state determination part
21c Third blockage risk state determination part
21u Determination threshold correction part
22 DOC temperature increase execution part
23 DPF forced regeneration condition determination part
24 DPF forced regeneration execution part
25 Counter reset process part
26 Temperature-increase temperature monitoring part
27 Mode start part
28 Notification part
28a First notification part
28b Second notification part
29 Blockage recovery process condition correction part
3 Exhaust gas treatment device
4 Temperature increase unit
41 Fuel injection device
42 Throttle valve
44 Exhaust pipe injection device
5 Temperature sensor
51 DOC inlet temperature sensor
52 DPF inlet temperature sensor
53 DPF outlet temperature sensor
6 Pressure sensor
61 DPF inlet pressure sensor
62 DPF outlet pressure sensor
63 DPF differential pressure sensor
7 Turbocharger
71 Exhaust turbine
72 Compressor
73 Shaft
8 EGR device
81 EGR pipe
82 EGR valve
9 ECU
C Counter value
C1 First counter value
C2 Second counter value
C3 Third counter value
V Threshold
V1 First threshold
V2 Second threshold
V3 Third threshold
D Temperature increase necessary state of DOC
D1 Blockage state of DOC
D2 Blockage risk state of DOC
F Forced regeneration execution flag
P Blockage parameter
Pc Blockage recovery process execution condition
Pcp Temperature-increase execution period
Pct Target temperature-increase temperature
Pf Forced regeneration execution condition
R Regeneration recovery process
Rf Forced regeneration process
Rc Blockage recovery process
Rc1 First temperature increase process
Rc2 Second temperature increase process
R1 First-type regeneration recovery process
R2 Second-type regeneration recovery process
T Temperature of DOC
T0 Activation temperature of DOC
T1 First temperature
T2 Second temperature

The invention claimed is:

1. A regeneration control device for an exhaust gas treatment device, which performs recovery of a DOC disposed in an exhaust passage of a diesel engine and forced regeneration of a DPF disposed in the exhaust passage downstream of the DOC, the regeneration control device comprising:
a DOC blockage risk state determination part configured to determine whether the DOC is in a blockage risk state which is a state where blockage of the DOC is likely to occur, on the basis of comparison between a counter value and a threshold related to an operation time of the diesel engine;
a DPF forced regeneration condition determination part configured to determine whether a forced regeneration execution condition for the DPF is satisfied;
a DOC temperature increase execution part configured to execute a blockage recovery process for increasing a temperature of the DOC to a first temperature regardless of whether the forced regeneration execution condition of the DPF is satisfied or not, if it is determined that the DOC is in the blockage risk state;
a DPF forced regeneration execution part configured to execute a forced regeneration process for increasing a temperature of the DPF to a second temperature and increasing the temperature of the DOC to the first temperature, if the forced regeneration execution condition is satisfied; and a counter reset process part configured to reset the counter value after completion of the forced regeneration process by the DPF forced regeneration execution part.

2. The regeneration control device for an exhaust gas treatment device according to claim 1, wherein the DPF forced regeneration execution part is configured to execute the blockage recovery process and execute the forced regeneration process after completion of the blockage recovery process, if the forced regeneration execution condition is satisfied.

3. The regeneration control device for an exhaust gas treatment device according to claim 1,
wherein the counter value includes a first counter value which is an accumulated duration time, within a closest predetermined period, of a low exhaust temperature operation state in which a temperature of exhaust gas discharged from the diesel engine is lower than an exhaust temperature threshold,
wherein the threshold includes a first threshold corresponding to the first counter value,
wherein the DOC blockage risk state determination part includes a first blockage risk state determination part configured to determine that the DOC is in the blockage risk state if the first counter value is greater than the first threshold,
wherein the DPF forced regeneration execution part is configured to execute the forced regeneration process after completion of the blockage recovery process by the DOC temperature increase execution part, if the first blockage risk state determination part determines that the DOC is in the blockage risk state, and
wherein the counter reset process part is configured to reset the counter value including the first counter value after completion of the forced regeneration process.

4. The regeneration control device for an exhaust gas treatment device according to claim 3,
wherein the DOC blockage risk state determination part further includes a determination threshold correction part configured to correct at least one of the exhaust temperature threshold or the first threshold on the basis of at least one of an atmospheric pressure, an atmospheric temperature, or a water temperature of the diesel engine.

5. The regeneration control device for an exhaust gas treatment device according to claim 3, further comprising a temperature-increase temperature monitoring part configured to monitor the temperature of the DOC during execution of the blockage recovery process.

6. The regeneration control device for an exhaust gas treatment device according to claim 5,
wherein the counter value includes a second counter value which is an accumulated operation time of the diesel engine,
wherein the threshold includes a second threshold corresponding to the second counter value,
wherein the DOC blockage risk state determination part further includes a second blockage risk state determination part configured to determine that the DOC is in the blockage risk state if the second counter value is greater than the second threshold,
wherein the counter reset process part is configured to reset the counter value including the second counter value after completion of the blockage recovery process executed in response to determination of the second blockage risk state determination part,
wherein the regeneration control device for the exhaust gas treatment device further includes a mode start part configured to start a temperature increase failure recovery mode configured to determine, as a temperature increase failure, a case in which the temperature of the DOC is higher than a first temperature threshold which is lower than the first temperature for no longer than a predetermined time, during execution of the blockage recovery process in response to determination by the first blockage risk state determination part, and start a temperature increase failure recovery mode for starting determination of the blockage risk state by the second blockage risk state determination part if the blockage recovery process is executed under the temperature increase failure successively a first number of times.

7. The regeneration control device for an exhaust gas treatment device according to claim 6,
wherein the second threshold is set such that an average time interval between two successive blockage recovery processes executed in response to determination by the second blockage risk state determination part is shorter than an average time interval between two successive blockage recovery processes executed in response to determination by the first blockage risk state determination part.

8. The regeneration control device for an exhaust gas treatment device according to claim 6,
wherein the mode start part is configured to end the temperature increase failure recovery mode if the temperature of the DOC in the blockage recovery process executed after the temperature increase failure recovery mode is started is greater than the first temperature threshold.

9. The regeneration control device for an exhaust gas treatment device according to claim 6,
further comprising a first notification part configured to notify that the blockage recovery process is performed under the temperature increase failure successively a second number of times, the second number being greater than the first number, or notify to prompt manual execution of the blockage recovery process if the blockage recovery process is performed under the temperature increase failure successively the second number of times.

10. The regeneration control device for an exhaust gas treatment device according to claim 6,
wherein the DOC blockage risk state determination part includes a determination threshold correction part configured to correct the second threshold on the basis of at least one of an atmospheric pressure, an atmospheric temperature, or a water temperature of the diesel engine.

11. The regeneration control device for an exhaust gas treatment device according to claim 5,
further comprising a blockage recovery process condition correction part configured to, in two successive blockage recovery processes, correct a temperature-increase temperature or a temperature-increase execution period in the blockage recovery process which is executed later, on the basis of the temperature of the DOC in the blockage recovery process which is executed earlier.

12. The regeneration control device for an exhaust gas treatment device according to claim 1,
wherein the counter value includes a third counter value which is an accumulated operation time of the diesel engine,
wherein the threshold includes a third threshold corresponding to the third counter value, wherein the DOC blockage risk state determination part includes a third blockage risk state determination part configured to determine that the DOC is in the blockage risk state if the third counter value is greater than the third threshold, and wherein the counter reset process part is configured to reset the counter value including the third counter value, after completion of the blockage recovery process executed in response to determination by the third blockage risk state determination part.

13. The regeneration control device for an exhaust gas treatment device according to claim 12, wherein the DOC blockage risk state determination part includes a determination threshold correction part configured to correct the third threshold on the basis of at least one of an atmospheric pressure, an atmospheric temperature, or a water temperature of the diesel engine.

14. The regeneration control device for an exhaust gas treatment device according to claim 1, wherein the DPF forced regeneration execution part is configured to execute the forced regeneration process after completion of the blockage recovery process, if the forced regeneration execution condition is satisfied after completion of the blockage recovery process by the DOC temperature increase execution part.

15. The regeneration control device for an exhaust gas treatment device according to claim 1, wherein the DOC temperature increase execution part is configured to interrupt the blockage recovery process if an interruption condition of the blockage recovery process in execution is satisfied.

16. The regeneration control device for an exhaust gas treatment device according to claim 15, wherein the DOC temperature increase execution part is configured to execute the blockage recovery process after elapse of a retry time, if the blockage recovery process is interrupted.

17. The regeneration control device for an exhaust gas treatment device according to claim 15, further comprising a second notification part configured to, if the blockage recovery process is interrupted a predetermined number of times, notify that the blockage recovery process is interrupted the predetermined number of times, or notify to prompt manual execution of the blockage recovery process.

18. The regeneration control device for an exhaust gas treatment device according to claim 1, wherein the DPF forced regeneration condition determination part is configured to determine that the forced regeneration execution condition is satisfied, if an estimate value of a PM accumulation amount at the DPF is greater than a predetermined value, if an operation time of an engine is longer than a predetermined time threshold, or if an accumulated value of a fuel injection amount of the diesel engine is greater than a predetermined amount.

19. The regeneration control device for an exhaust gas treatment device according to claim 1, wherein the DPF forced regeneration execution part is configured to interrupt the forced regeneration process if an abnormally high temperature of the DPF is detected during execution of the forced regeneration process, and wherein the DOC temperature increase execution part is configured to execute the blockage recovery process for a longer execution period if the forced regeneration process is interrupted in response to detection of the abnormally high temperature of the DPF, compared to a case where the abnormally high temperature of the DPF is not detected.

* * * * *